United States Patent [19]
Marshall et al.

[11] Patent Number: 6,101,493
[45] Date of Patent: *Aug. 8, 2000

[54] METHOD AND SYSTEM FOR DISPLAYING RELATED INFORMATION FROM A DATABASE

[75] Inventors: Dennis Alan Marshall, San Jose; Barbara H. Laird, Campbell; Timothy E. Hallbeck, Aptos, all of Calif.

[73] Assignee: Apple Computer, Inc., Cupertino, Calif.

[*] Notice: This patent is subject to a terminal disclaimer.

[21] Appl. No.: 09/268,859

[22] Filed: Mar. 15, 1999

Related U.S. Application Data

[63] Continuation of application No. 08/732,705, Oct. 18, 1996.

[51] Int. Cl.$^7$ ...................................................... G06F 17/30
[52] U.S. Cl. .................. 707/3; 707/6; 707/8; 707/103
[58] Field of Search ................................ 707/102, 3, 201, 707/526, 529, 509, 6, 8, 103, 530; 345/507, 340, 333, 509, 419, 329; 364/282.1; 503/201

[56] References Cited

U.S. PATENT DOCUMENTS

| | | | |
|---|---|---|---|
| 5,293,473 | 3/1994 | Hesse et al. ............................ | 707/529 |
| 5,388,196 | 2/1995 | Pajak et al. . | |
| 5,491,785 | 2/1996 | Robson et al. .......................... | 345/507 |
| 5,519,859 | 5/1996 | Grace ...................................... | 707/3 |
| 5,603,025 | 2/1997 | Tabb et al. ............................. | 364/282.1 |
| 5,608,898 | 3/1997 | Turpin et al. .......................... | 707/201 |
| 5,625,809 | 4/1997 | Dysart et al. . | |
| 5,640,579 | 6/1997 | Koppolu et al. ....................... | 707/526 |
| 5,644,736 | 7/1997 | Healy et al. ........................... | 345/340 |
| 5,652,850 | 7/1997 | Hollander ............................... | 345/333 |
| 5,664,127 | 9/1997 | Anderson et al. ..................... | 345/333 |
| 5,671,427 | 9/1997 | Nishimira .............................. | 707/509 |
| 5,671,429 | 9/1997 | Tanaka . | |
| 5,675,752 | 10/1997 | Scott et al. ............................. | 345/333 |
| 5,680,152 | 10/1997 | Bricklin ................................. | 345/419 |
| 5,689,665 | 11/1997 | Mitsui et al. .......................... | 345/419 |
| 5,717,924 | 2/1998 | Kawai .................................... | 503/201 |
| 5,926,806 | 7/1999 | Marshall et al. ....................... | 703/3 |
| 5,930,799 | 7/1999 | Tamano et al. ........................ | 707/102 |

*Primary Examiner*—Wayne Amsbury
*Assistant Examiner*—Thuy Pardo
*Attorney, Agent, or Firm*—Beyer Weaver Thomas & Nguyen

[57] ABSTRACT

A technique for displaying information from related tables of a database in different display windows on a display screen associated with a computer system is disclosed. The different display windows are interlinked such that a selection of one or more entries in one of the display windows causes the other of the display windows to distinguishably and orderly display those entries that are related to the selection. A graphical user interface (GUI) in which a main screen is produced having the interlinked display windows is also disclosed.

22 Claims, 18 Drawing Sheets

FIG. 14

METHOD AND SYSTEM FOR DISPLAYING RELATED INFORMATION FROM A DATABASE

This application is a continuation application of prior application Ser. No. 08/732,705 filed on Oct. 18, 1996, the disclosure of which is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

The present invention relates to a computer system having a database and, more particularly, to a method and system for displaying related information from a database to a computer system user.

2. Description of the Related Art

Application programs conventionally operate to present data to users in windows on a computer screen. Word-processing applications typically have a single window in which a user creates, views and modifies a document. Some word-processing applications allow two windows (i.e., two pages of a document) to be simultaneously displayed side-by-side. Spreadsheet applications and database applications also tend to interact with a user through a single window. Operating systems, such as Microsoft Windows® (hereafter Windows) and UNIX, have for many years enabled a user to open many different windows on a single computer screen. With Windows, only one of the windows can be active at a time but multiple windows can be viewed so long as no one window utilizes the entire computer screen. With UNIX, multiple windows can also be viewed but multiple windows can be active concurrently. In any event, each window in these examples is largely independent of any other window simultaneously available.

In data management applications, including database development and retrieval applications as well as bookkeeping and accounting programs, data is entered, viewed and modified in accordance with the purposes of the application and the desires of the user. The data is stored by the application in records which form a database. To view the data stored in the database, a query is manually created and then presented to the database to request the particular portion of the data the user is interested in viewing. In response to the query, the appropriate data records are returned from the database. The returned data records are then displayed in a window to the user. However, the manual generation of queries is not only burdensome but also typically restricted to particular tables of the database. Hence, a separate query must be later made to other particular tables of the database to return data records for these other particular tables. The returned data records are normally displayed in or over the window displaying the results of the previous query. Therefore, the need to use separate queries is very detrimental to one's ability to retrieve and view related information across different tables in the database.

For example, one popular small business management program known as Quickbooks from Intuit, Inc. is able to view or provide reports in certain categories of information. FIG. 13 is a pictorial diagram of an exemplary screen 10 of Quickbooks for a "Filter" configure operation in which certain transactions for a business can be retrieved and placed in a report. The certain transactions are identified by settings for various of the fields shown in the screen 10. For example, as illustrated in the screen 10, the transactions selected are those transactions dated from Dec. 1, 1995 to Dec. 15, 1995. Once the filter is configured, a query to a database is made to retrieved desired data for the certain transactions. FIG. 14 illustrates a representative report screen 12 produced by Quickbooks. The reports screen 12 in this example is a report of Sales by Customer Detail for Rock Castle Construction dated Dec. 1–15, 1995. The report screen 12 is organized by invoice data and produced by selecting a filter button 14 to perform the "Filter" configuration, and then by selecting a reports menu 16 to run a report. Hence, Quickbooks is able to produce reports using only those records of its database that meet the criteria set in the filter configuration. Similarly, a "Find" or "List" type operation can be conventionally invoked to retrieve data from the database that meet certain criteria. Although conventional operations will return to the user the records (e.g., invoices) that meet these limitations, there is no way of obtaining or simultaneously displaying the other information (e.g., product and customer information) from the database (namely in other tables) that is related to the invoices identified without having to specifically request the information using these conventional operations. According to these conventional techniques, the user is not able to readily retrieve the desired related information on products or customers for the identified invoices because such information is not in the invoice category. To retrieve such product or invoice information, the user would have to initiate another conventional operation (e.g., "Find," "List" or "Filter" operation) and utilize only those fields made available to the user. Further, only one window is available on the computer screen to display the retrieved information. Hence, invoking another instance of these conventional techniques, eliminates the displayed results of the previous instance. These deficiencies makes it very difficult or impossible to retrieve and display the desired related information.

Thus, there is a need for techniques to provide more effective ways to retrieve and view interrelated information from a database.

SUMMARY OF THE INVENTION

Broadly speaking, the invention is a technique for displaying information from related tables of a database in different display windows on a display system. The different display windows are interlinked such that a selection of one or more entries in one of the display windows causes the other of the display windows to distinguishably display those entries that are related to the selection. An improved graphical interface for utilizing the technique is also provided.

The invention can be implemented in numerous ways, including as a system, a device, a method, or a computer readable medium. Several embodiments of the invention are discussed below.

As a computer system, an embodiment of the invention includes a database containing tables of data, a display device and a processor unit. The display device has a plurality of display areas, and each of the display areas displays data from an associated table within the database. The processor unit operates to access the database to retrieve the data from the corresponding associated tables and then display the retrieved data in the display areas corresponding thereto, and to detect a selection associated with one of the display areas and thereafter to automatically modify the data being displayed in the other of the display areas in accordance with the selection. Preferably, the selection operates to select at least one data item in the one of the display areas, and the modification of the data operates to display data items in the other of the display areas that are related to the selected at least one data item in a graphically distinct manner.

As a graphical user interface for a display screen of a computer, an embodiment of the invention includes a first display area having a first label and a first data window, the first data window displays a first type of data in multiple rows and columns, and the first label identifies the first type of data; and a second display area having a second label and a second data windows the second data window displays a second type of data in multiple rows and columns, and the second label identifies the second type of data. Either a first selection of at least one of the rows in the first data window or a second selection of at least one of the rows in the second data window can be made. When the first selection of at least one of the rows in the first data window occurs, the rows in the second data window that are associated with the first selection are automatically visually distinguished from other of the rows. When the second selection of at least one of the rows in the second data window occurs, the rows in the first data window that are associated with the second selection are automatically visually distinguished from other of the rows. The graphical user interface, of course, can include additional display areas. The graphical user interface may also further include count indicators that are displayed proximate to the corresponding display area.

As a method for displaying data on a display device of a computer system, the data being obtained from a database associated with the computer system, an embodiment of the invention includes: providing the display device with a plurality of display areas, each of the display areas displays data records from an associated table within the database; and interlinking the display areas via the database such that a selection of certain of the displayed data records in one of the display areas causes data records in at least one of the other display areas that are associated with the selection to be identified.

As a method for displaying data on a display device of a computer system, the data being obtained from tables in a database associated with the computer system, the display device having a plurality of display areas, an embodiment of the invention includes the operations of: displaying entries from the database in the display areas; determining whether a selection of one or more entries being displayed in a particular one of the display areas has occurred; obtaining a key from the database in accordance with the selection; notifying the other of the display areas of the key; and updating the entries in the other of the display areas so as to visually distinguish those of the entries that are associated with the key with those entries that are not associated with the key.

As a computer readable media containing program instructions for displaying data on a display device of a computer system, with the data being obtained from tables in a database associated with the computer system, and the display device having a plurality of display areas, an embodiment of the invention includes: first computer readable code devices for determining whether a selection of one or more entries being displayed in a particular one of the display areas has occurred; second computer readable code devices for obtaining a key from the database in accordance with the selection; third computer readable code devices for notifying the other of the display areas of the key; and fourth computer readable code devices for updating the entries in the other of the display areas so as to visually distinguish those of the entries that are associated with the key from those entries that are not associated with the key.

The advantages of the invention are numerous. One advantage of the invention is that a user is able to obtain and view on a display screen information within a database related to a selection by the user with minimal user effort and frustration. As a result, the user is able to more efficiently and effectively review related information than conventionally possible.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

Figure 14:
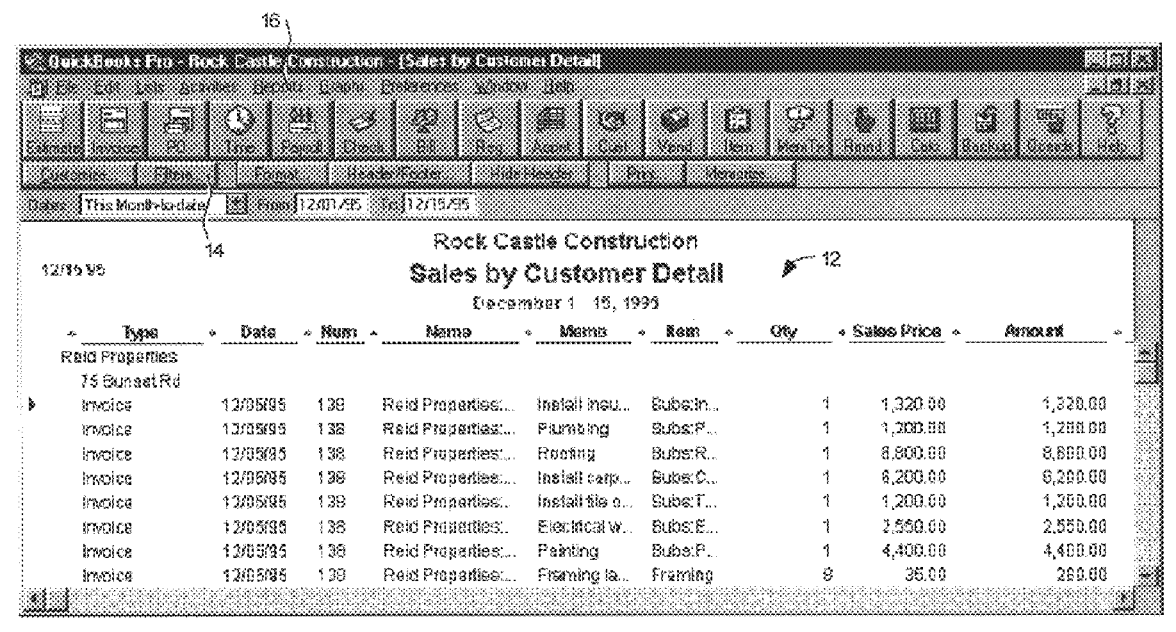

FIGS. 13 and 14 are pictorial diagrams of an exemplary screens of a conventional software package known as Quickbooks.

DETAILED DESCRIPTION OF THE INVENTION

The invention pertains to a technique for displaying information from related tables of a database in different display windows on a display screen associated with a computer system. The different display windows are interlinked such that a selection of one or more entries in one of the display windows causes the other of the display windows to distinguishably and orderly display those entries that are related to the selection. The invention also pertains to a graphical user interface (GUI in which a main screen is produced having the different display windows that are interlinked.

Figure 1:
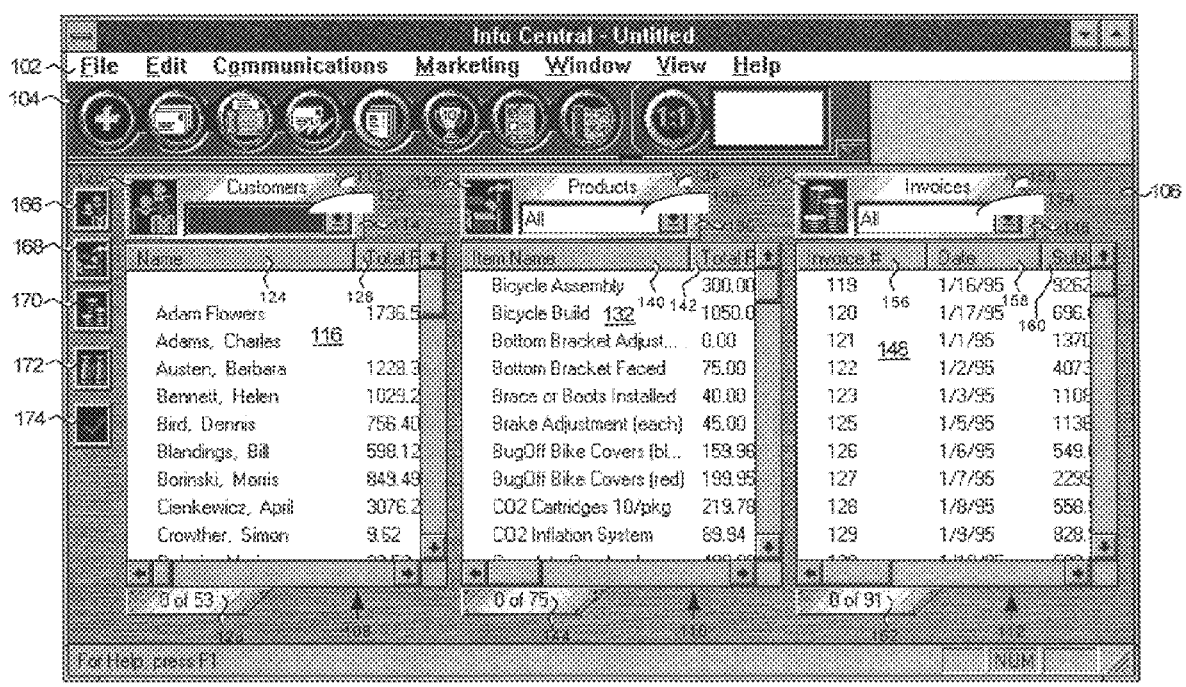
FIG. 1 is a pictorial diagram of a main screen according to an embodiment of the invention.

FIG. 1 is a pictorial diagram of a main screen 100 according to an embodiment of the invention. The main screen 100 is displayed on a display screen associated with a computer system. Hence, the main screen 100 operates as a graphical user interface (GUI) for a user of the computer system.

The main screen 100 includes the menu 102, a tool bar 104, and an information display region 106. The information display region 106 includes a first display area 108, a second display area 110 and a third display area 112. As explained in detail below, the first, second and third display areas 108, 110 and 112 are interlinked such that selections in any of the display areas invoke automatic modifications to the other of the display areas. By interlinking display areas in this manner, related information being displayed in the display areas can be readily identified.

The first display area 108 includes a first information area 114 and a list box 116. The first information area 114 includes a label plate 118, a full-size button 120, and a group drop down list box 122. The list box 116 is a multicolumn list box. The list box 116 lists or otherwise displays multiple entries with a row and column format. The list box 116 includes column headings 124 and 126 (as well as other column headings that are not illustrated in FIG. 1 partly because the size of the list box 116 is less than its maximum size) which provide labels for the columns of the list box 116. The first display area 108 also includes a count plate 128 placed at the lower portion of the list box 116. The count plate 128 displays or otherwise indicates a number of selected entries within the list box 116 as well as a number of total entries within the list box 116.

The second display area 110 includes a second information area 130 and a list box 132. The second information area 130 includes a label plate 134, a full-size button 136, and a group drop down list box 138. The list box 132 is a multicolumn list box. The list box 132 includes column headings 140 and 142 (as well as other column headings that are not illustrated in FIG. 1 because the size of the list box 132 is less than its maximum size) which provide labels for the columns of the list box 132. The list box 132 lists or otherwise displays multiple entries with a row and column format. The second display area 110 also includes a count plate 144 placed at the lower portion of the list box 132. The count plate 144 displays or otherwise indicates a number of selected entries in the list box 132 as well as the number of total entries within the list box 132.

The third display area 112 includes a third information area 146 and a list box 148. The third information area 146 includes a label plate 150, a full-size button 152, and a group drop down list box 154. The list box 148 is a multicolumn list box. The list box 148 includes column headings 156, 158 and 160 (as well as other column headings that are not illustrated in FIG. 1 because the size of the list box 148 is less than its maximum size) which provide labels for the columns of the list box 148. The list box 148 lists or otherwise displays multiple entries with a row and column format. The third display area 112 also includes a count plate 162 placed at the lower portion of the list box 148. The count plate 162 indicates a number of selected entries in the list box 148 as well as a number of total entries within the list box 148.

The information display region 106 further includes a secondary button area 164. Within the secondary button area 164, numerous buttons are provided for additional features. In particular, toggle buttons 166, 168 and 170 are provided to toggle the list boxes 116, 132 and 148 between on and off states. As illustrated in FIG. 1, all the list boxes 116, 132 and 148 are in their on state. However, if, for example, one of the toggle buttons 116, 132 or 148 were activated, then the associated list box would be switched to an off state and the remaining list boxes remaining in the on state would preferably expand to fill the screen space vacated by the list box that has been switched to the off state. The secondary button area 164 further includes a detail button 172 that launches a detailed mode (detailed screen) for the selected one of the categories for the selected display area. The list boxes 116, 132 and 148 in FIG. 1 are illustrated in view mode wherein data can be viewed in the various list boxes. In the detailed mode (not shown) data can be entered or modified, whereas in the view mode data is viewed. A check button 174 may also provided in the secondary button area 164 to deactivate the interlinking of the display areas 108, 110 and 112 (i.e., list boxes 116, 132 and 148).

An exemplary embodiment pertains to use of the invention in the context of a small business application program that executes on a computer system. In this regard, the main screen 100 illustrated in FIG. 1 is associated with such a small business application program. The default set-up preferences for the main screen 100 in the view mode are illustrated in FIG. 1 and are useful for a typical small business. Namely, the first display area 108 pertains to customers, the second display area 110 pertains to products/services, and the third display area 112 corresponds to invoices. Further, in the exemplary embodiment, the tool bar 104 of the main screen 100 enables a user to perform common marketing and communication functions. In particular, the icon buttons illustrated in the main tool bar 104 from left to right are as follows: an add button can be used to create a customer, product/service or invoice, a letters button can be used to create letters, a fax button can be used to send faxes, an e-mail button can be used to send e-mail, a reports button can be used to generate reports, a top-ten report button can be used to create a top-ten report, a to-do button can be used to bring up a to-do dialog, an introductory button can be used to perform an introductory task such as training the user to perform tasks for a typical small business, and a module button can be used to activate any of a number of modules that are initially provided with the system or later added, such as a marketing advisor and a futures module.

Figure 2:
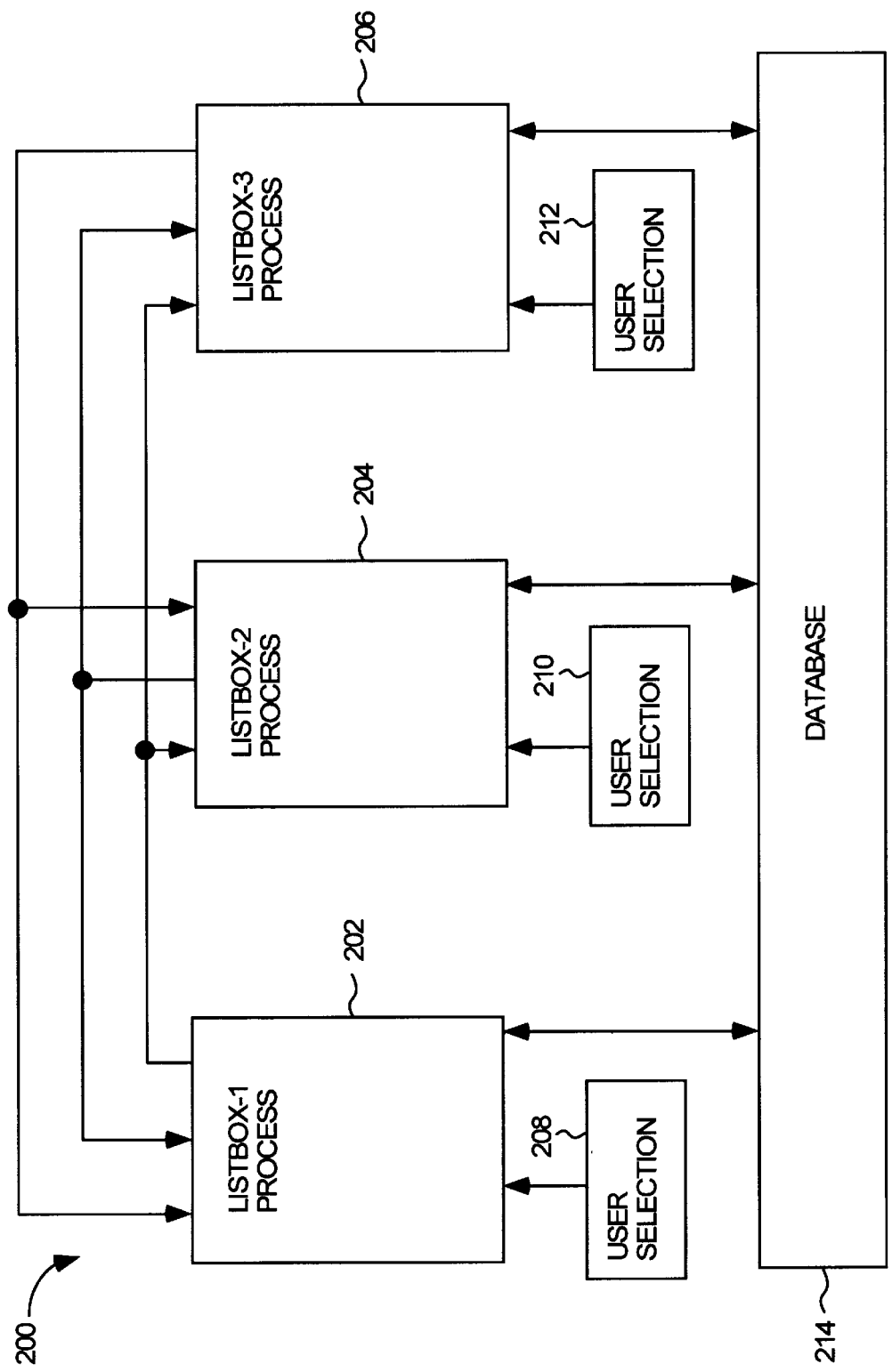
FIG. 2 is a block diagram of a system arrangement according to an embodiment of the invention.

FIG. 2 is a block diagram of a system arrangement 200 according to an embodiment of the invention. The system arrangement 200 includes hardware and software features used implement the operations performed by the invention. The system arrangement 200 is provided within a computer system. An exemplary computer system is described below with reference to FIG. 9.

The system arrangement 200 includes a list box-1 process 202, a list box-2 process 204 and a list box-3 process 206. These list box processes 202, 204 and 206 respectively correspond to the list boxes 116, 132 and 148 illustrated in FIG. 1. In this regard, the list box-1 process 202 performs the processing necessary to produce the appropriate data within the list box 116; the list box-2 process 204 performs the processing necessary to produce the appropriate data within the list box 132; and the list box-3 process 206 performs the processing necessary to produce the appropriate data within the list box 148. Although the list box processes 202, 204 and 206 are illustrated as separate processes, these processes can be implemented by a single process or block of executable computer instructions, or by multiple processes or multiple threads.

The system arrangement 200 also includes user selections 208, 210 and 212 and a database 214. The user selections 208, 210 and 212 are selections of one or more entries in the list boxes 116, 132 and 148, respectively. As an example, the user selections can be achieved with a pointing device. More particularly, with respect to the list box-1 process 202, a user selection 208 will result from a user selecting one or more of the entries within the list box 116. The user can also select a group of the entries within the list box 116 by using the group drop down list box 122. As an example, the group drop down list box 122 could contain group designators such as "All" (the illustrated group in FIG. 1), "Frequent Buyers," or "Retailers." The group designators will vary with the list boxes as well as with the type of application. After one or more of the entries within the list box 116 have been selected by the user selection 208, the list box-1 process 202 will obtain a key from the database 214. Using the key, the list box processes 204 and 206 together with the database 214 operate to retrieve, order and display the appropriate entries in the list boxes 132 and 148. Those of the entries that are associated with the user selection 208 are distinguishably displayed from the other entries in the list boxes 132 and 148. The processing performed by the invention is described in greater detail below.

Figure 3:
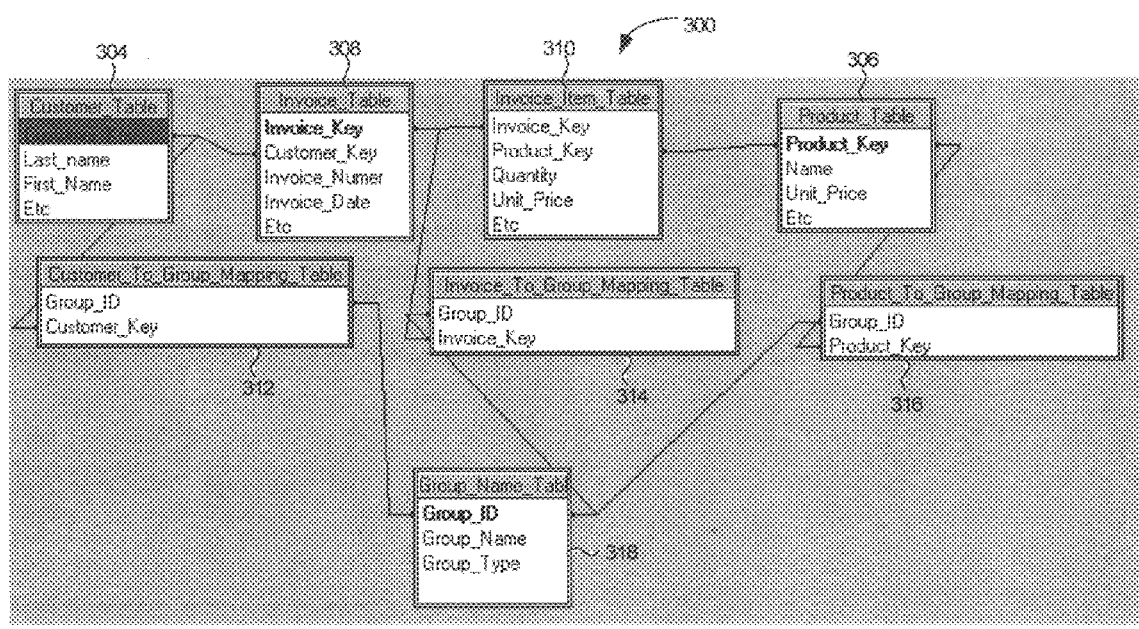
FIG. 3 is a database according to an embodiment of the invention.

FIG. 3 is a database 300 according to an embodiment of the invention. As an example, the database 300 is suitable for use as the database 214 illustrated in FIG. 2. The database 300 includes primary tables and secondary tables. The primary tables include a customer table 304, a product table 306 and an invoice table 308. The secondary tables include an invoice item table 310, a customer to group mapping table 312, an invoice to group mapping table 314, a product to group mapping table 316, and a group name table 318. The invoice item table 310 acts as an intermediary table that relates invoice keys to product keys. Hence, when relating customer keys to product keys, the invoice item table may be used as an intermediary to facilitate the conversion. The secondary tables 312, 314, 316 and 318 are used to operate with group selections. The group selections can be performed by any of the group drop down list boxes 122, 138 and 154 of the main screen 100 illustrated in FIG. 1.

Figure 4:
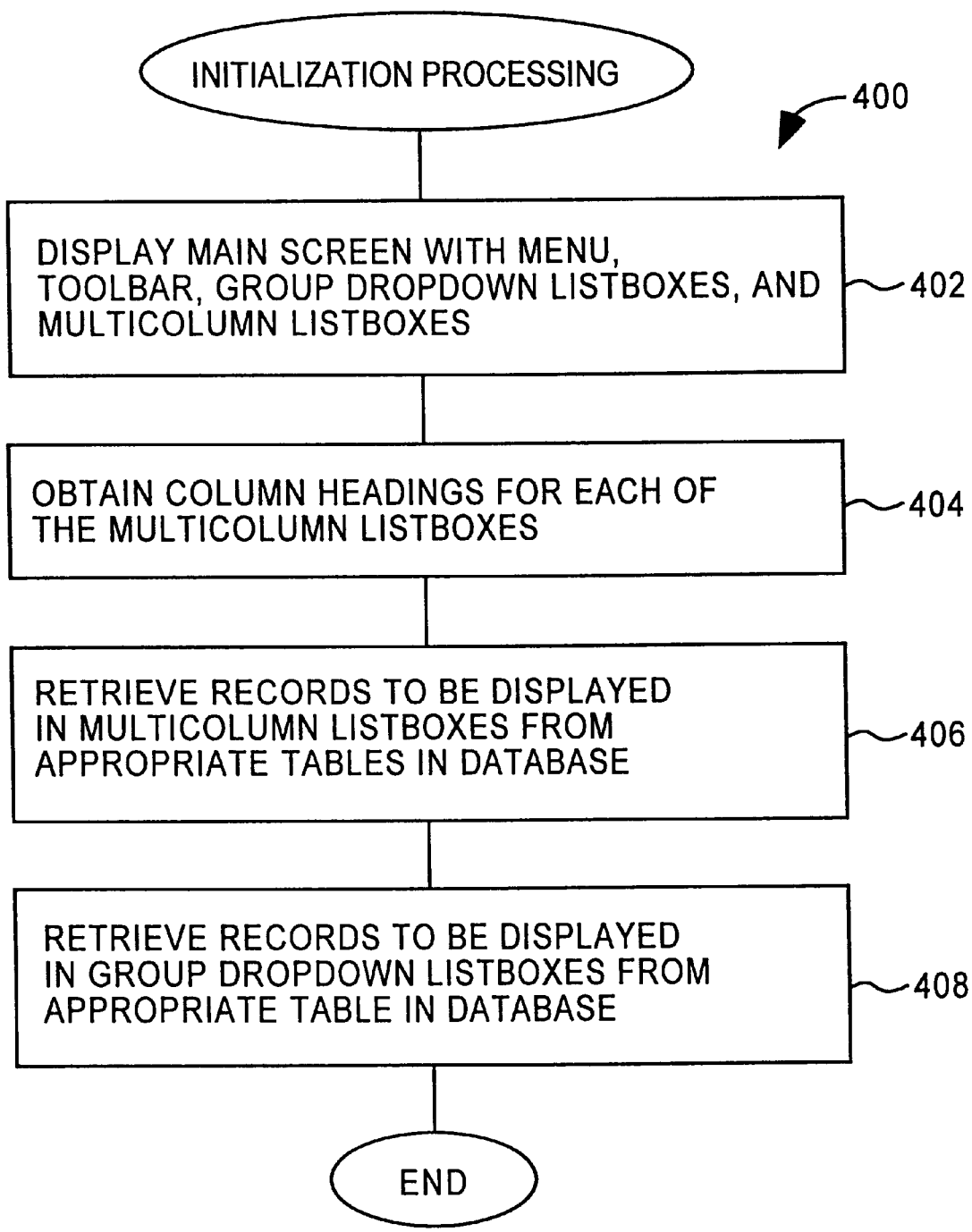
FIG. 4 is a flow diagram of initializing processing according to an embodiment of the invention.

FIG. 4 is a flow diagram of initializing processing 400 according to an embodiment of the invention. The initialization processing 400 is performed to initially fill the list boxes 116, 132 and 148 illustrated in FIG. 1. Depending on the implementation, the initialization processing 400 can be performed by the list box processes 202, 204 and 206 illustrated in FIG. 2 or by some other separate process or processes. Initially, the main screen 100 with the menu 102, the tool bar 104 and the group drop down list boxes 122, 138 and 154, and list boxes 116, 132 and 148 are displayed (402). Next, column headings (e.g., column headings 124, 126, 140, 142, 156, 158 and 160) for each of the list boxes 116, 132 and 148 are provided (404). Then, records to be displayed in the list boxes 116, 132 and 148 are retrieved from the appropriate tables in the database 214, 300 (406). The records are retrieved using queries to the database 214, 300. Also, records (i.e., group names) to be displayed in the group drop down list boxes 122, 138 and 154 are retrieved from the appropriate table in the database 214, 300 (408). For example, the group names can be retrieved by queries to the group name table 318 of the database 214, 300. Following block 408, the initialization processing 400 is complete and ends.

Figure 5A:
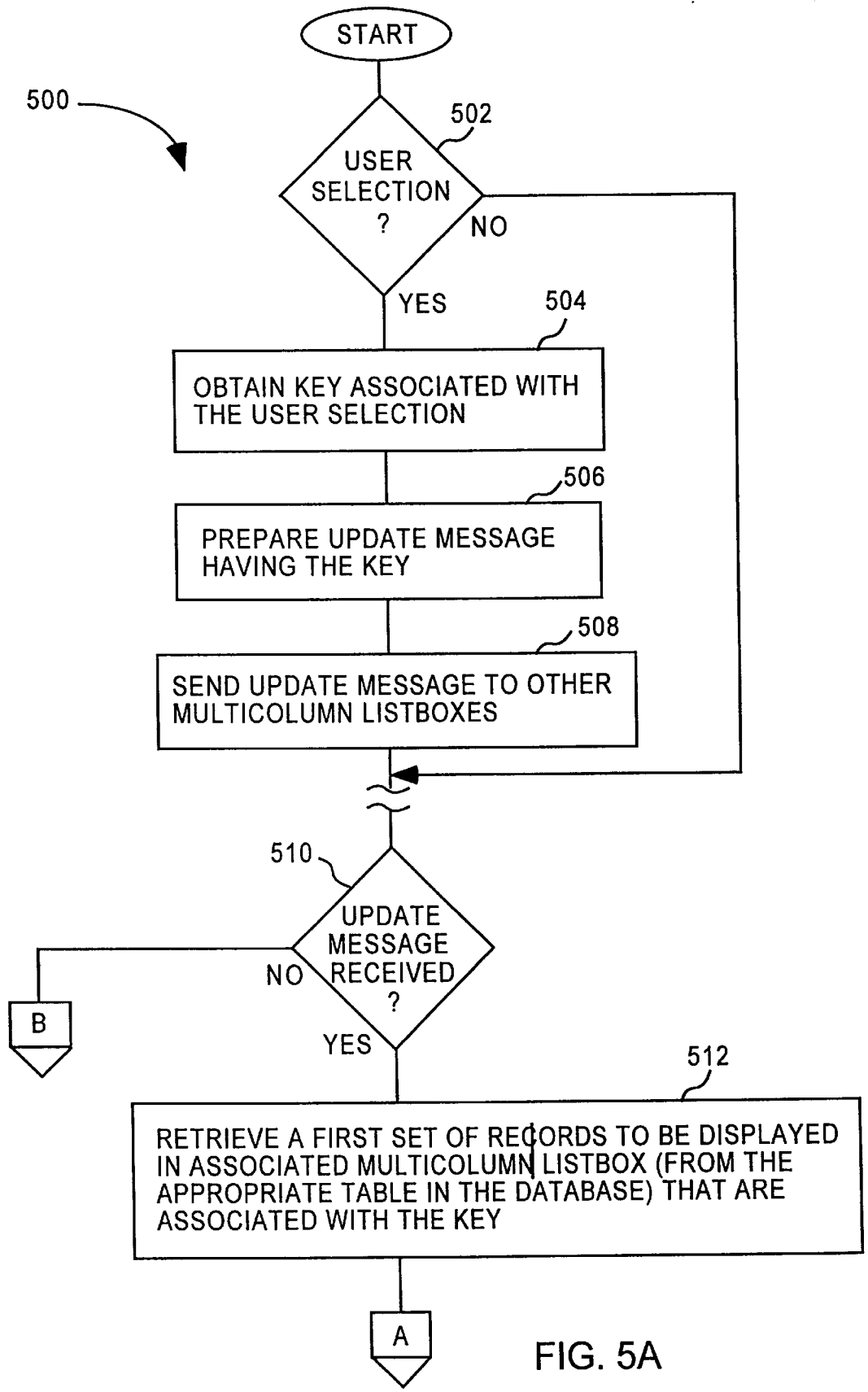
FIGS. 5A and 5B are flow diagrams illustrating select and update processing according to a basic embodiment of the invention.
Figure 5B:
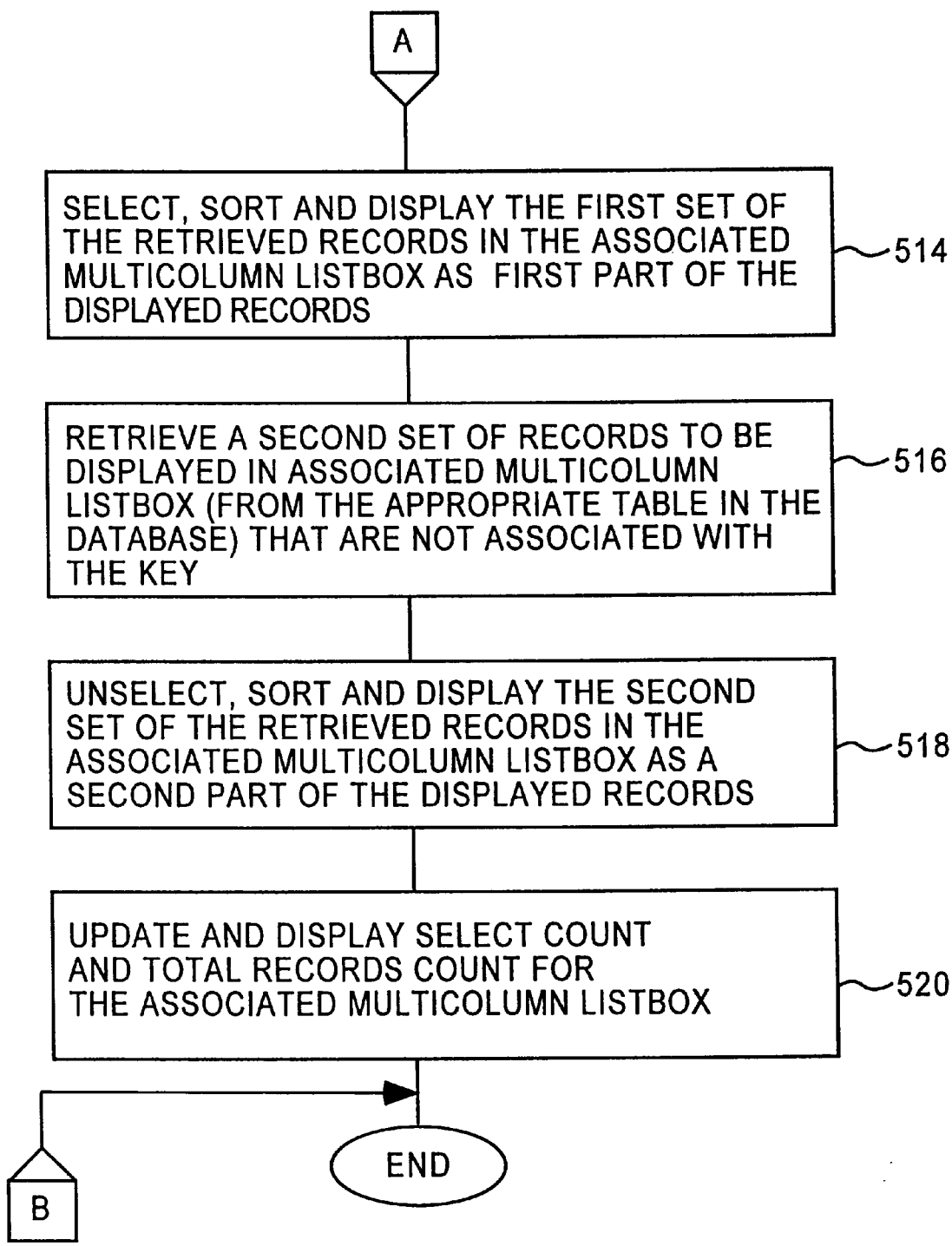

FIGS. 5A and 5B are flow diagrams illustrating select and update processing 500 according to a basic embodiment of the invention. The select and update processing 500 can be performed by the list box processes 202, 204 and 206 illustrated in FIG. 2 or by some other separate process or processes.

The select and update processing 500 begins with a decision block 502 that determines whether a user selection has been received. The user selection involves the user selecting one or more entries in one of the list boxes 116, 132 and 148. If a user selection has been received, then a key associated with the user selection is obtained 504. The key represents the user selection in the database 214, 300. Then, an update message having the key is prepared 506. Next, the update message is sent 508 to the other of the list boxes. On the other hand, if the decision block 502 determines that no user selection has been made, then blocks 504–508 are bypassed.

Thereafter, following block 508 or following block 502 when no user selection has been made, a decision block 510 determines whether an update message has been received. The select and update processing 500 can be viewed as having a select processing portion which is that processing prior to block 510 and an update processing portion which begins at block 510. If an update message has been received, a first set of records to be displayed in the associated list box are retrieved 512. The first set of records are retrieved 512 from an appropriate table in the database 214, 300 that is associated with the key that accompanies the update message. Then, the first set of the retrieved records are selected, sorted, and then displayed 514 in the associated list box as the first part of the displayed records. A second set of records to be displayed in the associated list box are also retrieved 516. These records are retrieved 516 from an appropriate table in the database 214, 300 but are not associated with the key that accompanies the update message. Next, the second set of retrieved records are unselected, sorted and then displayed 518 in the associated list box as a second part of the displayed records. Thereafter, a select count and a total records count for the associated list box are updated and displayed 520 proximate to the associated list box. Following block 520 in the case in which an update message is received, as well as following block 510 in the case in which no update message is received, the select and update processing 500 is complete and ends.

An example of the operation of the invention is now described for the selected update processing 500 illustrated in FIGS. 5A and 5B with reference to FIGS. 1–4.

Initially, a main screen is set-up according to the initialization processing 400 illustrated in FIG. 4. As an example, once set-up, the main screen may appear similar to the main screen 100 illustrated in FIG. 1, at least in the case of the exemplary embodiment. A user then starts the select and update processing 500 by selecting one or more entries being displayed in one of the list boxes 116, 132 and 148 of the main screen 100. After the user selection has been made, the key associated with the user selection is obtained 504 from the database 214, 300. In the exemplary embodiment, the key may be a customer key, a product/service key or an invoice key. Next, an update message having the key is sent 508 to the other of the list boxes. At this point, the selection has been processed and now the list boxes 116, 132 and 149 are updated in accordance with the selection.

In updating the list boxes 116, 132 and 148, the list box receiving the selection highlights the user selection, and the other of the list boxes process the update message they receive. The update message informs these other list boxes that they need to update the information they display. The update to each of the other list boxes is generally performed as follows. First, a first set of records are retrieved 512 from the table in the database 214, 300 that is associated with the key. With respect to FIGS. 1 and 3, the list box 116 is associated with the customer table 304, the list box 132 is associated with the product table 306, and the list box 148 is associated with the invoice table 308. After the first set of records is retrieved, the retrieved records are selected, sorted and displayed in the associated list box. The selection of these retrieved records is performed so that they will be distinguishably displayed from other records to be display in the associated list box. The sorting of the retrieved records operates to reorder the retrieved records based on a predetermined sort criteria. The subsequent display of the selected and sorted retrieved records displays the retrieved records in the associated list box such that they are indicated (i.e., distinguishably displayed) to the user as being associated with the user selection.

Next, a second set of records are retrieved 516 from the table in the database 214, 300 that is associated with the key. The retrieved records are then unselected, sorted and displayed 518 in the associated list box. The unselection of these retrieved records is performed in this embodiment so that they will not be distinguishably displayed as selected records (even if previously displayed as selected), but other embodiments may not need to perform such unselection. The sorting of the retrieved records of the second set operates similar to the sorting of the first set. The subsequent display of the unselected and sorted retrieved records displays the retrieved records in the associated list box such that there is no indication to the user that these records are associated with the user selection because these records are in fact not associated with the user selection. Hence, the first and second sets of records are displayed in the associated list box, preferably the second set follows the first set. Finally, a select count and a total count can also be displayed. Preferably, the select count and the total count are displayed 520 in a count plate proximate to the list box.

Figure 10:
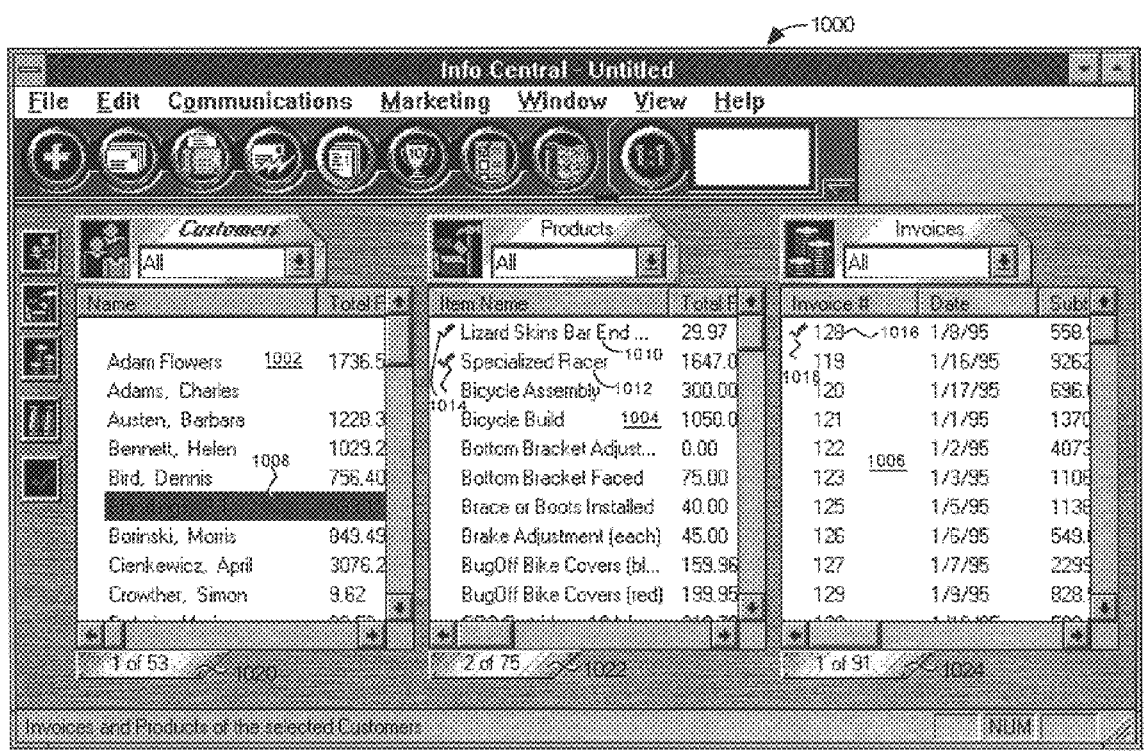
FIGS. 10–12 are pictorial diagrams of a main screen illustrating operations of embodiments of the invention.

FIG. 10 is a pictorial diagram of a main screen 1000 illustrating operation of an embodiment of the invention. Specifically, FIG. 10 illustrates the display results for a specific instance of the previously described example. The main screen 1000 has list boxes 1002, 1004 and 1006 which correspond respectively to the list boxes 116, 132, and 148, of FIG. 1. Here, the user selection occurred in the list box 1002 pertaining to customer information. Namely, the user selected record 1008 containing information about customer "Blandings, Bill" and is so identified by being highlighted. Then, according to the invention, the other list boxes 1004 and 1006 are automatically modified such that they visually indicate those records that are related to the user selection. Here, in the list box 1004 pertaining to product information, the records 1010 and 1012 are related to the user selection (i.e., first set of retrieved records) and are thus sorted (in this example alphabetically) and placed at the top of the list box 1004 before those records that are not related to the user selection (i.e., second set of retrieved records). These records 1010 and 1012 are also visually indicated as being related to the user selection by check-mark graphic images 1014 placed adjacent to these records 1010 and 1012 within the list box 1004. In the list box 1006 pertaining to invoice information, the record 1016 is the only record related to the user selection. The record 1016 is thus placed at the top of the list box 1006 before any of the other records. Although no sorting need occur with a single record, in general, the sorting would normally be numerically be invoice number or date in the list box 1006 that pertains to invoice information. The record 1016 is also given a check-mark graphic image 1018 to visually indicate that it is related to the user selection. Moreover, each of the list boxes 1002, 1004 and 1006 includes a count plate 1020, 1022 and 1024, respectively, for displaying the respective select count and total count. For example, the count plate 1022 displays "2 of 75", which means that two (2) records are selected out of a total of seventy-five (75) records.

Alternatively, the select and update processing 500 could operate differently in other embodiments. For example, one such embodiment could operate to manipulate (reorder and select) the records or entries of the existing lists within the list boxes without having to access the database 214, 300 to obtain these records. The ad vantage would be a speed improvement for the updating, but the disadvantages are increased memory utilization and use of possibly stale data.

FIGS. 6A–8B are flow diagrams illustrating processing associated with a more detailed embodiment of the invention. These flow diagrams assume that the system arrangement of the processing follows the system arrangement 200 of FIG. 2. However, it should be recognized that the system arrangement 200 is primarily conceptual as numerous implementations with different arrangements are possible. For example, all the processing could be done within a single process. In any case, the discussion of FIGS. 6A–8B assumes the system arrangement 200 of FIG. 2.

Figure 6A:
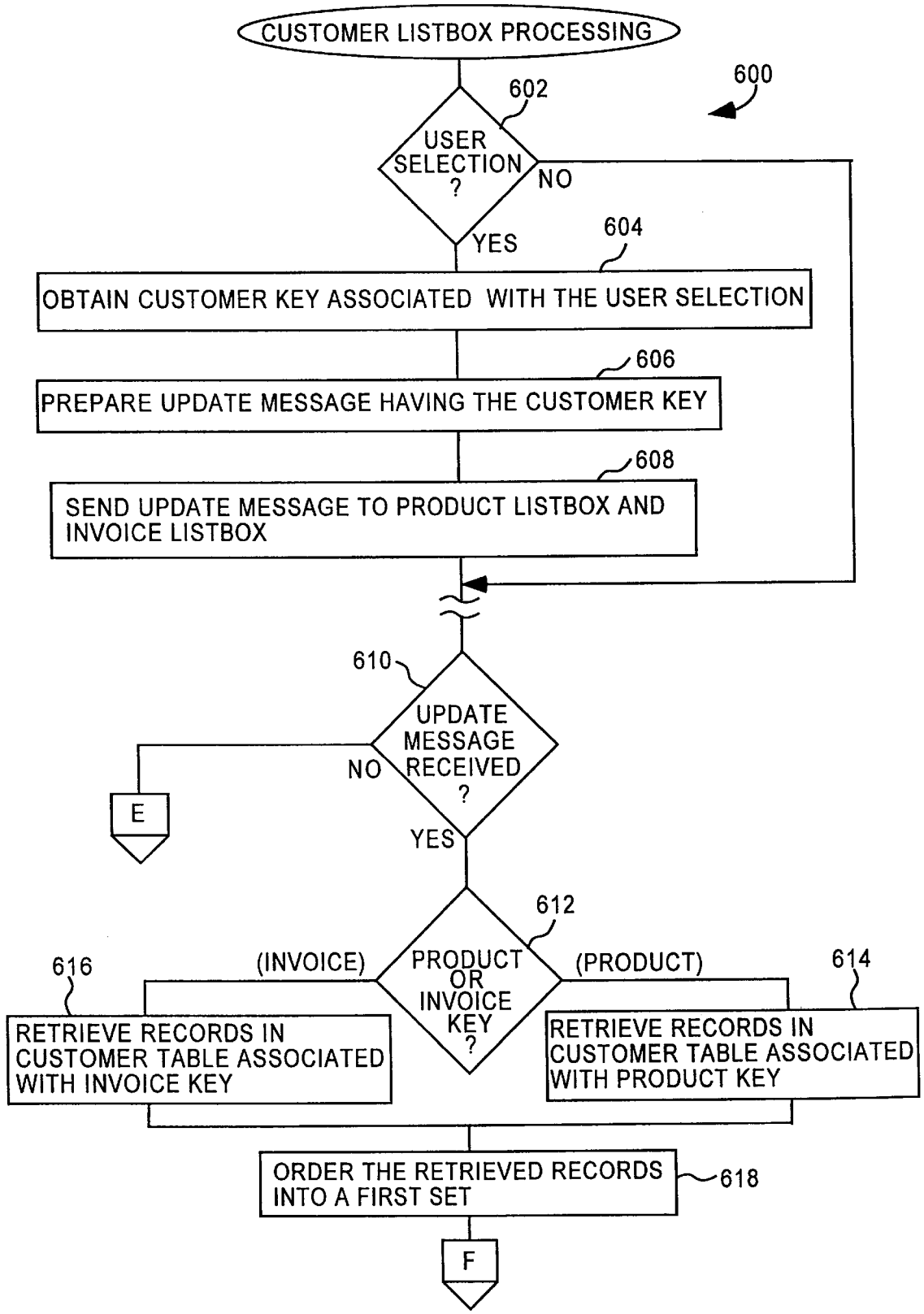
FIGS. 6A and 6B are flow diagrams of customer list box processing according to an embodiment of the invention.
Figure 6B:
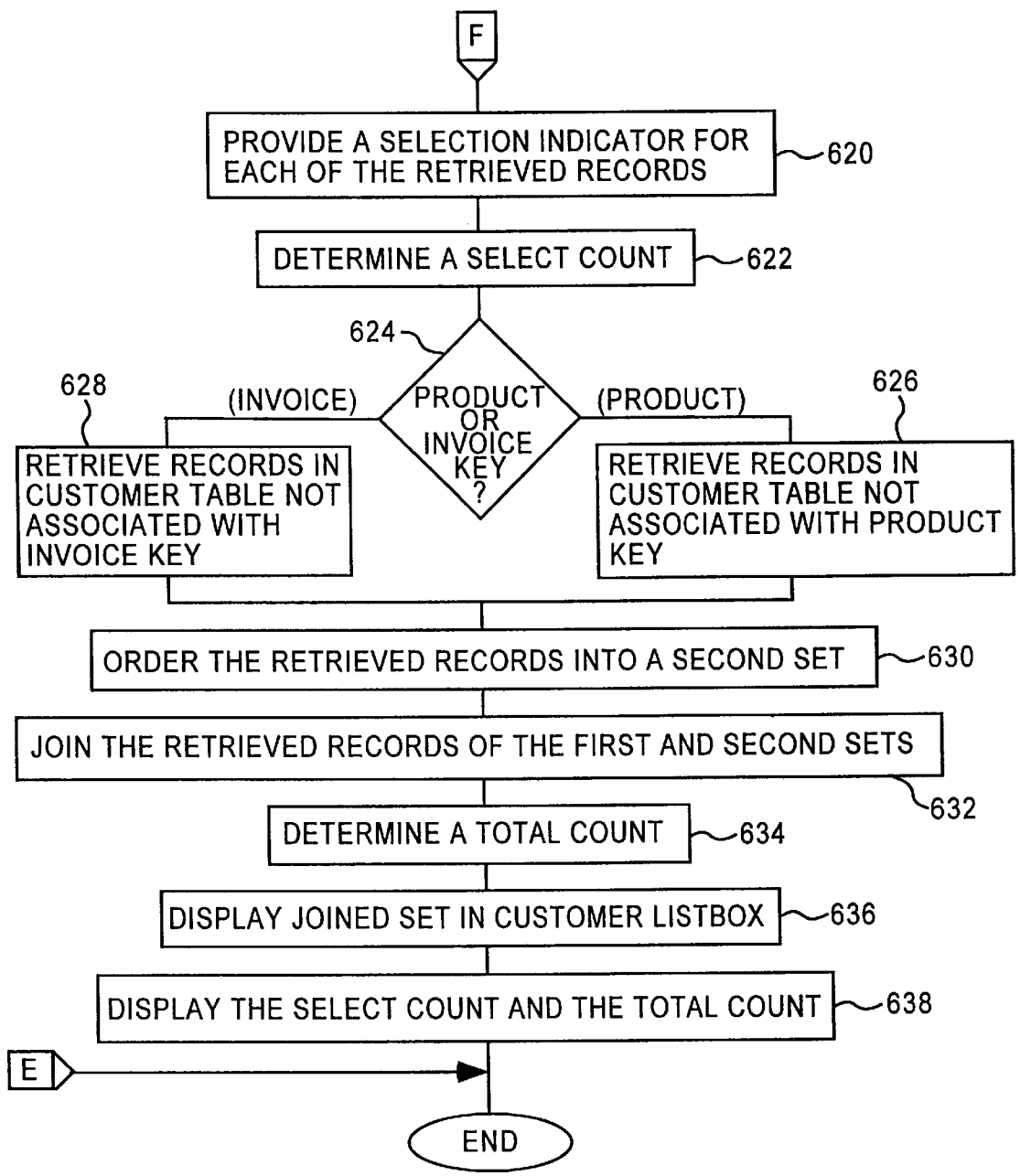

FIGS. 6A and 6B are flow diagrams of customer list box processing 600 according to an embodiment of the invention. The customer list box processing 600 is preferably performed by the list box-1 process 202 illustrated in FIG. 2 which is in turn performed by a computer system having a display screen for displaying information to a user and a user input device for receiving input from the user. An exemplary computer system is described below with reference to FIG. 9.

The customer list box processing 600 begins with a decision block 602 that determines whether a user selection has been made. The user selection is, for example, achieved by the user input device of the computer system. Since the customer list box processing 600 pertains to the customer list box 116, the user selection is of one or more customer records. When the decision block 602 determines that a user selection has been made, the customer list box processing 600 proceeds to perform blocks 604–608. On the other hand, when the decision block 602 determines that no user selection has been made, the blocks 604–608 are bypassed.

Once the user selection has been made, a customer key associated with the user selection is obtained 604. In the exemplary embodiment, the customer key is obtained 604 by accessing the customer table 304 to retrieve the customer key associated with the user selection. Then, an update message having the customer key is prepared 606. An example of an update message is "MESSAGE_RefreshProductList". The update message that has been prepared is then sent 608 to the product list box 132 and the invoice list box 148. In the exemplary embodiment, the forwarding of the update message can be achieved by "SendMessage (MESSAGE_RefreshCustomerList);" in the case of Windows.

Following block 608 directly or following the decision block 602 in the case in which no user selection occurred, a decision block 610 determines whether an update message has been received. At this point, the customer list box processing 600 shifts to a message processing mode, whereas previously, the customer list box processing 600 was in a message generation mode. Although these two modes are described with respect to a single flow diagram, it should be recognized that these different modes could be separate processes, threads or objects. In any event, when the decision block 610 determines that no update message has been received, the customer list box processing 600 is complete and ends.

On the other hand, when the decision block 610 determines that an update message has been received, the customer list box processing 600 proceeds to process the incoming update message. A decision block 612 determines whether the update message has either a product key or an invoice key associated therewith. If the update message has a product key associated therewith, then records in the customer table 304 associated with the product key are retrieved 614. On the other hand, if the update message received has an invoice key associated therewith, then records in the customer table 304 associated with the invoice key are retrieved 616. Following either block 614 or block 616, the retrieved records are ordered 618 into a first set. In one embodiment, the ordering 618 sorts the records in accordance with a predetermined criteria. Here, in the customer list box processing, the records are customer records; hence, an alphabetical sorting is used (see, e.g., list box 116 in FIG. 1). Then, a selection indicator for each of the retrieved records is provided 620. The selection indicator operates to distinguishably display the retrieved records of the first set. The selection indicator is a visual indication to the user that is provided for each of the retrieved records of the first set to thereby visually indicate those records as being associated with the user selection. As an example, the selection indicator can be a check-mark graphic image such as illustrated in FIG. 10. A select count is also determined 622. The select count is the count of the retrieved records in the first set.

A decision block 624 then determines whether the update message being processed has a product key or an invoice key. If the update message has the product key, records in the customer table 304 not associated with the product key are retrieved 626. On the other hand, if the update message has the invoice key, records in the customer table not associated with the invoice key are retrieved 628. Following either block 626 or 628, the retrieved records are ordered 630 into a second set. In one embodiment, the ordering 630 sorts the records in accordance with a predetermined criteria.

Next, the retrieved records of the first and second sets are joined 632. The resulting joined set is the list of records that are displayed. The joined set is then displayed 636 in the customer list box. Note the same records can be displayed by displaying the joined set or by displaying the first set followed by the second set. A total count is also determined 634. The total count is the count of the number of records in the joined set. Also, the select count and the total count are displayed 638. Following block 638, the customer list box processing 600 is complete and ends.

Figure 11:
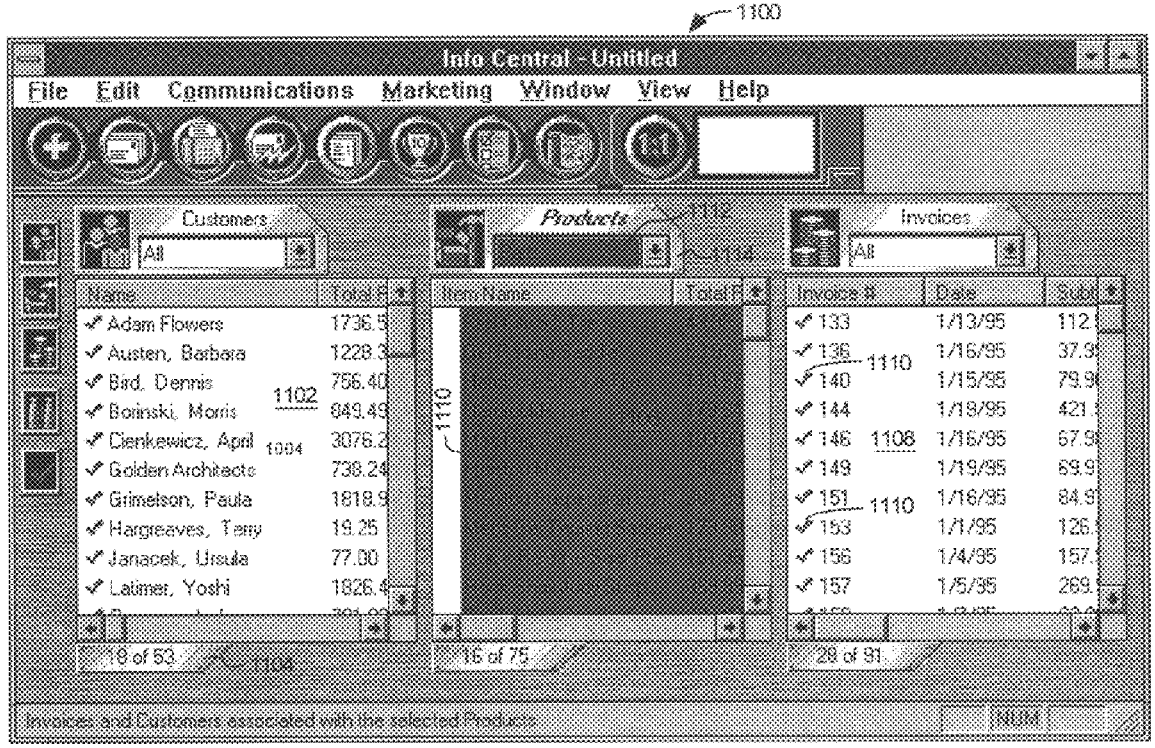

FIG. 11 is a pictorial diagram of a main screen 1100 illustrating operation of embodiment of the invention. Specifically, FIG. 11 illustrates among other things the display results for a specific instance of the customer list box processing 600. Here, the customer list box 1102 displays eighteen (18) selected customers with the check-mark graphic image adjacent thereto. In this case, the records of the first set completely fill the list box 1102 being illustrated. Also note that each of the records in the first set are sorted in alphabetical order. The associated count plate 1104 for the customer list box 1102 indicates that eighteen (18) of fifty-three (53) total records are selected.

Figure 7A:
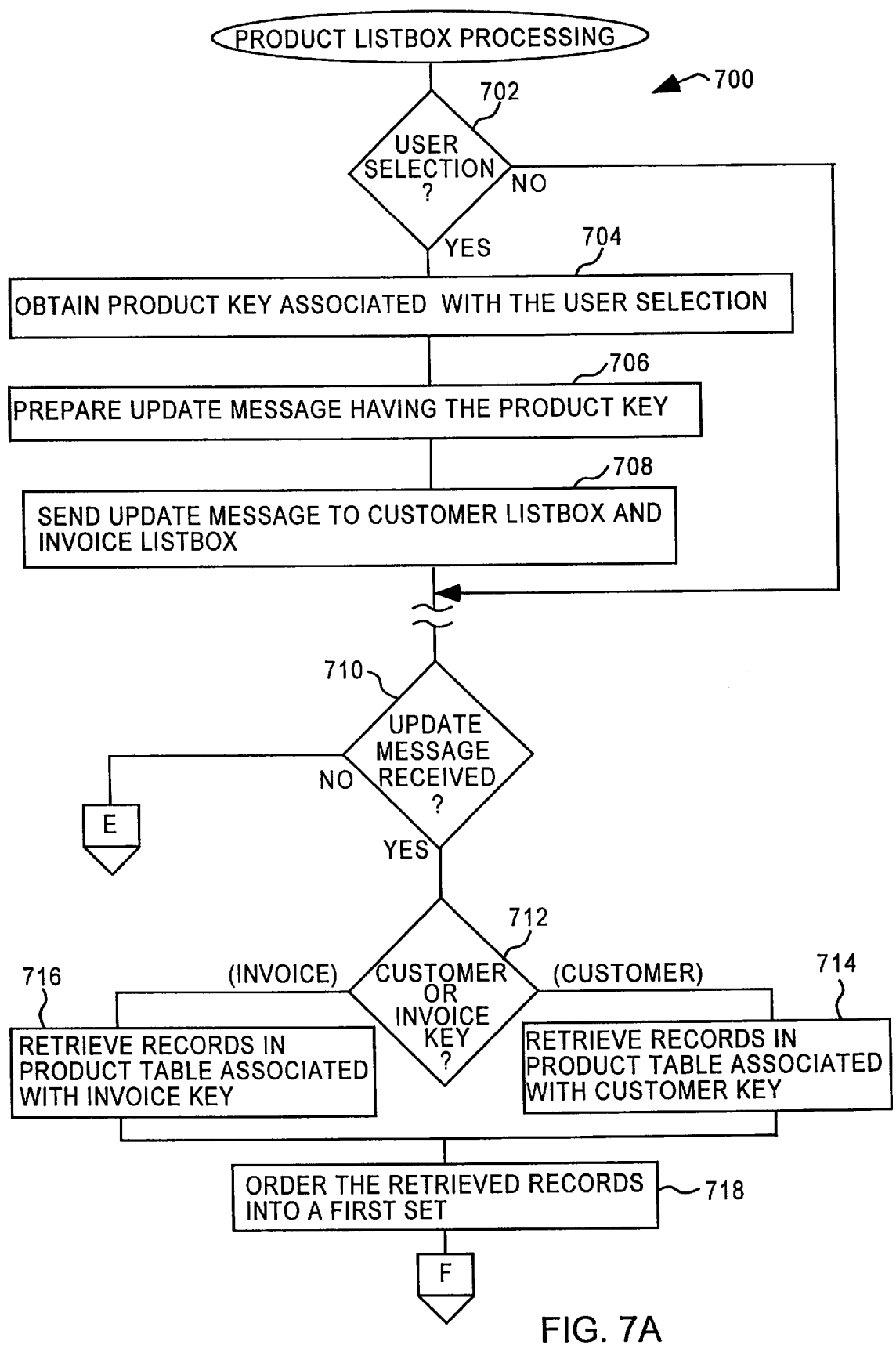
FIGS. 7A and 7B are flow diagrams of product list box processing according to an embodiment of the invention.
Figure 7B:
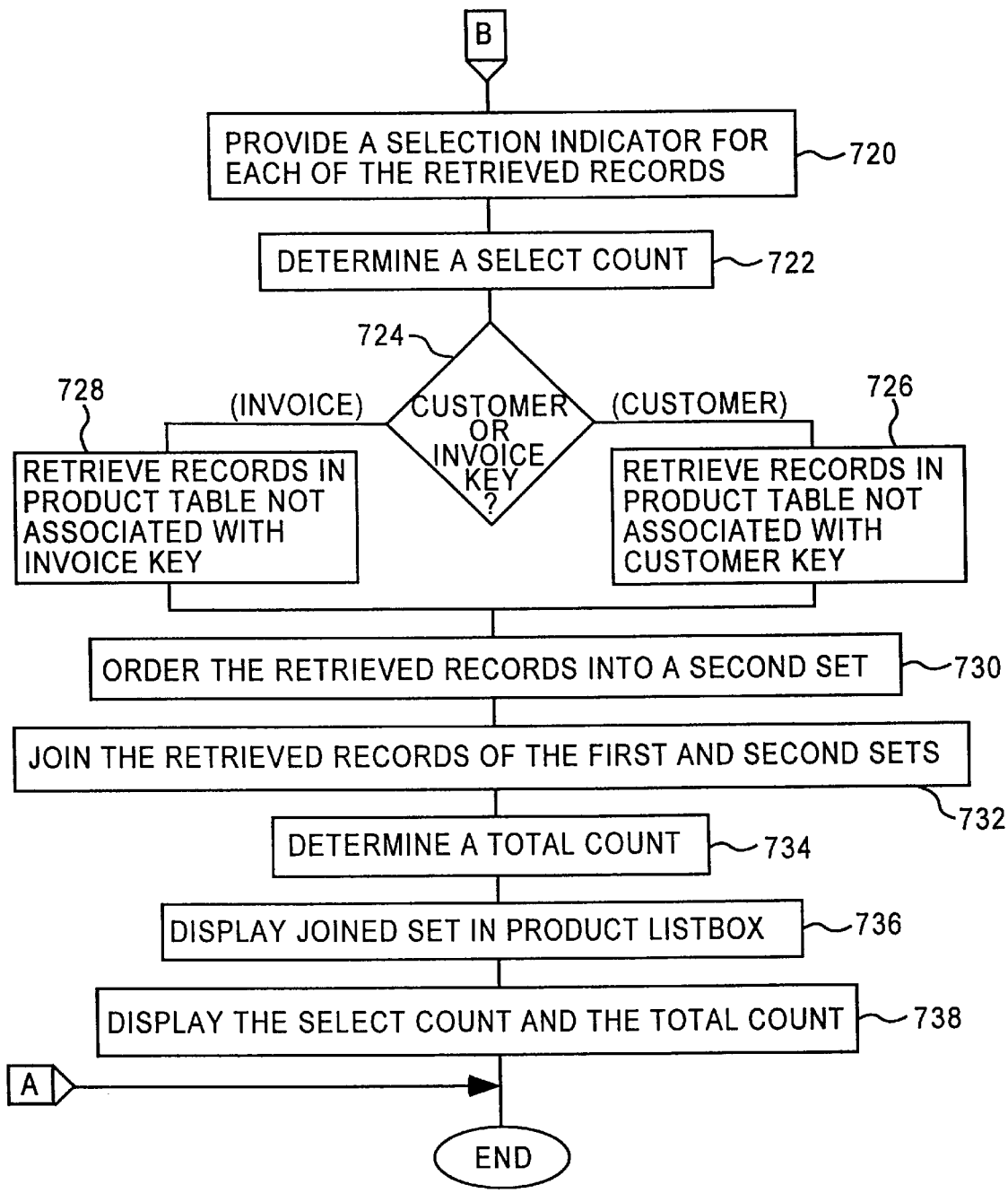

FIGS. 7A and 7B are flow diagrams of product list box processing 700 according to an embodiment of the invention. The product list box processing 700 is preferably performed by the list box-2 process 204 illustrated in FIG. 2 which is in turn performed by a computer system having a display screen for displaying information to a user and a user input device for receiving input from the user. An exemplary computer system is described below with reference to FIG. 9.

The product list box processing 700 begins with a decision block 702 that determines whether a user selection has been made. The user selection is, for example, achieved by the user input device of the computer system. Since the product list box processing 700 pertains to the product list box 132, the user selection is of one or more product records. More generally, the product records may be product or service records. When the decision block 702 determines that a user selection has been made, the product list box processing 700 proceeds to perform blocks 704–708. On the other hand, when the decision block 702 determines that no user selection has been made, the blocks 704–708 are bypassed.

Once the user selection has been made, a product key associated with the user selection is obtained 704. In the exemplary embodiment, the product key is obtained 704 by accessing the product table 306 to retrieve the product key associated with the user selection. Then, an update message having the product key is prepared 706. An example of an update message is "MESSAGE_RefreshCustomerList". The update message that has been prepared is then sent 708 to the customer list box 116 and the invoice list box 148. In the exemplary embodiment, the forwarding of the update message can be achieved by "SendMessage (MESSAGE_RefreshCustomerList);" in the case of Windows.

Following block 708 directly or following the decision block 702 in the case in which no user selection occurred, a decision block 710 determines whether an update message has been received. At this point, the product list box processing 700 shifts to a message processing mode, whereas previously, the product list box processing 700 was in a message generation mode. Although these two modes are described with respect to a single flow diagram, it should be recognized that these different modes could be separate processes, threads or objects. In any event, when the decision block 710 determines that no update message has been received, the product list box processing 700 is complete and ends.

On the other hand, when the decision block 710 determines that an update message has been received, the product list box processing 700 proceeds to process the incoming update message. A decision block 712 determines whether the update message has either a customer key or an invoice key associated therewith. If the update message has a customer key associated therewith, then records in the product table 306 associated with the customer key are retrieved 714. On the other hand, if the update message received has an invoice key associated therewith, then records in the product table 306 associated with the invoice key are retrieved 716. Following either block 714 or block 716, the retrieved records are ordered 718 into a first set. In one embodiment, the ordering 718 sorts the records in accordance with a predetermined criteria. Here, in the product list box processing 700, the records are product records; hence, an alphabetical sorting could be used (see, e.g., list box 132 in FIG. 1). Then, a selection indicator for each of the retrieved records is provided 720. The selection indicator operates to distinguishably display the retrieved records of the first set. The selection indicator is a visual indication to the user that is provided for each of the retrieved records of the first set to thereby visually indicate those records as being associated with the user selection. A select count is also determined 722. The select count is the count of the retrieved records in the first set.

A decision block 724 then determines whether the update message being processed has a customer key or an invoice key. If the update message has the customer key, records in the product table 306 not associated with the customer key are retrieved 726. On the other hand, if the update message has the invoice key, records in the product table 306 not associated with the invoice key are retrieved 728. Following either block 726 or 728, the retrieved records are ordered 730 into a second set. In one embodiment, the ordering 730 sorts the records in accordance with a predetermined criteria.

Next, the retrieved records of the first and second sets are joined 732. The resulting joined set is the list of records that are displayed. The joined set is then displayed 736 in the product list box. Note the same records can be displayed by displaying the joined set or by displaying the first set followed by the second set. A total count is also determined 734. The total count is the count of number of records in the joined set. Also, the select count and the total count are displayed 738. Following block 738, the product list box processing 700 is complete and ends.

With respect to the pictorial diagram of a main screen 1000 illustrated in FIG. 10 which illustrates among other things the display results for a specific instance of the product list box processing 700. Here, the product list box 1004 displays two (2) selected products (records 1010 and 1012) with the check-mark graphic image 1014 adjacent thereto. In this case, the records of the first set being illustrated occupy the first two (2) rows within the product list box 1004. Also note that each of the records in the first set are sorted in alphabetical order. The remaining rows within the product list box 1004 are records of the second set. The associated count plate 1022 for the product list box 1004 indicates that two (2) of seventy-five (75) total records are selected.

Figure 8A:
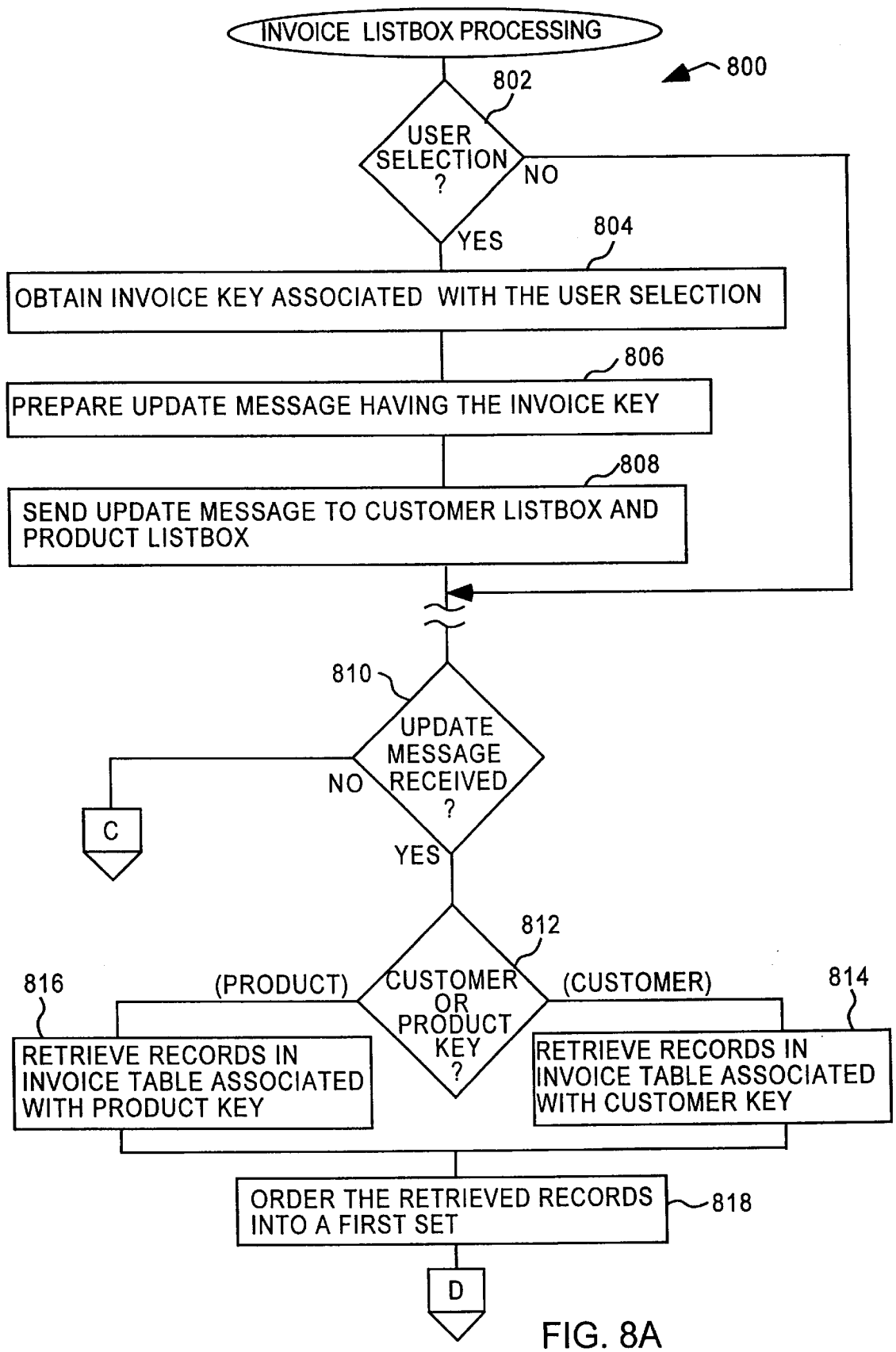
FIGS. 8A and 8B are flow diagrams of invoice list box processing according to an embodiment of the invention.
Figure 8B:
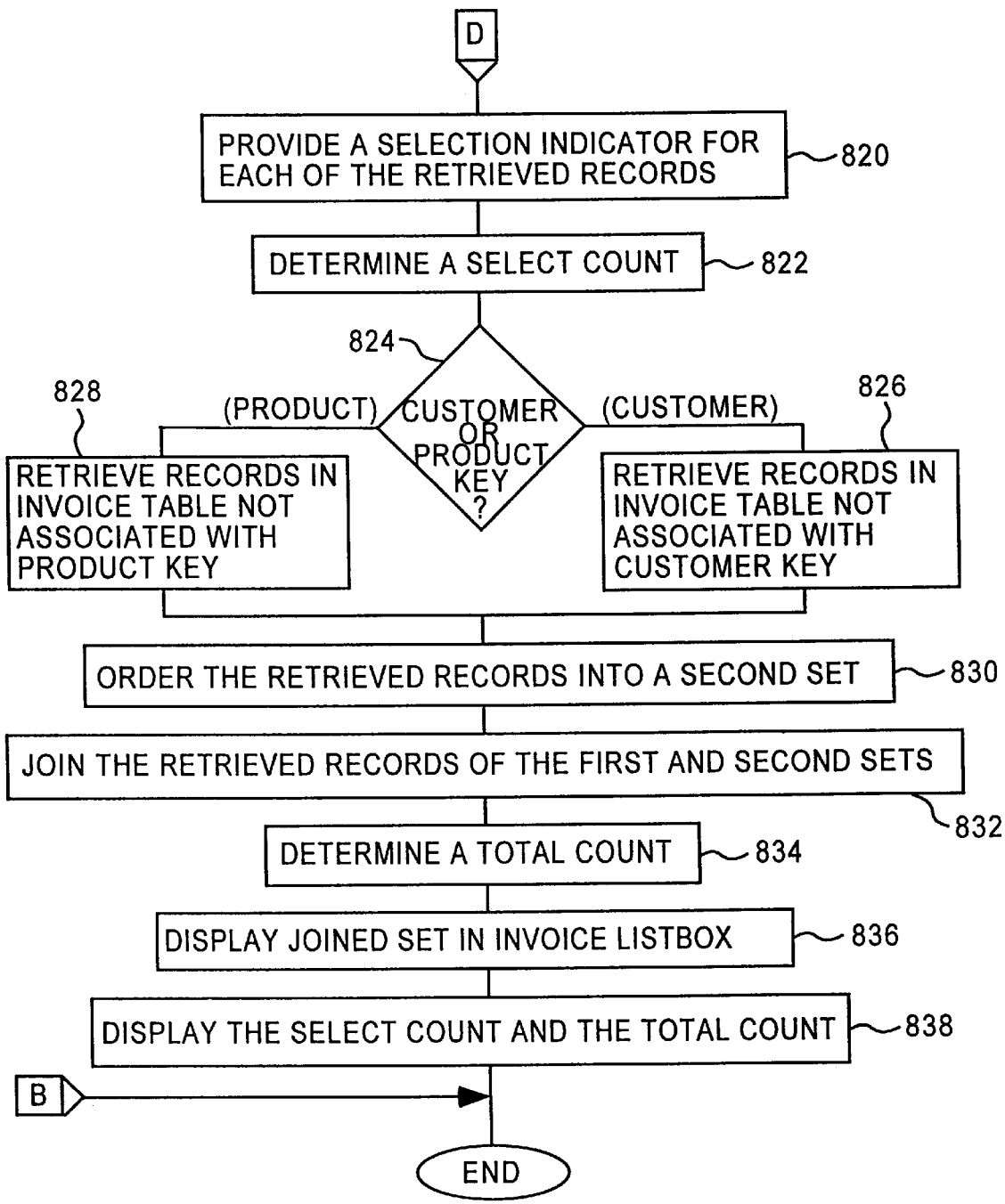

FIGS. 8A and 8B are flow diagrams of invoice list box processing 800 according to an embodiment of the invention. The invoice list box processing 800 is preferably performed by the list box-3 process 206 illustrated in FIG. 2 which is in turn performed by a computer system having a display screen for displaying information to a user and a user input device for receiving input from the user. An exemplary computer system is described below with reference to FIG. 9.

The invoice list box processing 800 begins with a decision block 802 that determines whether a user selection has been made. The user selection is, for example, achieved by the user input device of the computer system. Since the invoice list box processing 800 pertains to the invoice list box 148, the user selection is of one or more invoice records. When the decision block 802 determines that a user selection has been made, the invoice list box processing 800 proceeds to perform blocks 804–808. On the other hand, when the decision block 802 determines that no user selection has been made, the blocks 804–808 are bypassed.

Once the user selection has been made, a invoice key associated with the user selection is obtained 804. In the exemplary embodiment, the invoice key is obtained 804 by accessing the invoice table 308 to retrieve the invoice key associated with the user selection. Then, an update message having the invoice key is prepared 806. An example of an update message is "MESSAGE_RefreshCustomerList". The update message that has been prepared is then sent 808 to the customer list box 116 and the product list box 132. In the exemplary embodiment, the forwarding of the update message can be achieved by SendMessage (MESSAGE_RefreshCustomerList);"in the case of Windows.

Following block 808 directly or following the decision block 802 in the case in which no user selection occurred, a decision block 810 determines whether an update message has been received. At this point, the invoice list box processing 800 shifts to a message processing mode, whereas previously, the invoice list box processing 800 was in a message generation mode. Although these two modes are described with respect to a single flow diagram, it should be recognized that these different modes could be separate processes, threads or objects. In any event, when the decision block 810 determines that no update message has been received, the invoice list box processing 800 is complete and ends.

On the other hand, when the decision block 610 determines that an update message has been received, the invoice list box processing 800 proceeds to process the incoming update message. A decision block 812 determines whether the update message has either a customer key or a product key associated therewith. If the update message has a customer key associated therewith, then records in the invoice table 308 associated with the customer key are retrieved 614. On the other hand, if the update message received has a product key associated therewith, then records in the invoice table 308 associated with the product key are retrieved 816. Following either block 814 or block 816, the retrieved records are ordered 818 into a first set. In one embodiment, the ordering 818 sorts the records in accordance with a predetermined criteria. Here, in the invoice list box processing, the records are invoice records; hence, a numerical sorting is used (see, e.g., list box 148 in FIG. 1). Then, a selection indicator for each of the retrieved records is provided 820. The selection indicator operates to distinguishably display the retrieved records of the first set. The selection indicator is a visual indication to the user that is provided for each of the retrieved records of the first set to thereby visually indicate those records as being associated with the user selection. As an example, the selection indicator can be a check-mark graphic image 1018 such as illustrated in FIG. 10. A select count is also determined 822. The select count is the count of the retrieved records in the first set.

A decision block 824 then determines whether the update message being processed has a customer key or a product key. If the update message has the customer key, records in the invoice table 308 not associated with the customer key are retrieved 826. On the other hand, if the update message has the product key, records in the invoice table 308 not associated with the product key are retrieved 828. Following either block 826 or 828, the retrieved records are ordered 830 into a second set. In one embodiment, the ordering 830 sorts the records in accordance with a predetermined criteria.

Next, the retrieved records of the first and second sets are joined 832. The resulting joined set is the list of records that are displayed. The joined set is then displayed 836 in the invoice list box. Note the same records can be displayed by displaying the joined set or by displaying the first set followed by the second set. A total count is also determined 834. The total count is the count of number of records in the joined set. Also, the select count and the total count are displayed 838. Following block 838, the invoice list box processing 800 is complete and ends.

With respect to the pictorial diagram of a main screen 1000 illustrated in FIG. 10 which illustrates among other things the display results for a specific instance of the invoice list box processing 800. Here, the invoice list box 1004 displays one (1) selected invoice (record 1016) with the check-mark graphic image 1018 adjacent thereto. In this case, the records of the first set being illustrated occupy the first row within the invoice list box 1006. In the invoice list box 1004 of FIG. 10, there is only a single record in the first set so no sorting or reordering is needed in this specific instance. The remaining rows within the invoice list box 1006 are records of the second set. The associated count plate 1024 for the invoice list box 1006 indicates that one (1) of ninety-one (91) total records are selected.

With respect to the pictorial diagram of a main screen 1100 illustrated in FIG. 11 which illustrates among other things the display results for another specific instance of the invoice list box processing 800. Here, the invoice list box 1108 displays twenty-eight (28) selected invoices (record 1016) with the check-mark graphic image 1108 adjacent thereto. In this case, the records of the first set being illustrated occupy the all the displayed rows of the invoice list box 1108. In the invoice list box 1108 of FIG. 11, the records of the first set are ordered or sorted numerically by the invoice number. The remaining rows within the invoice list box 1108 are records of the second set.

According to the invention, the user selection made by the user in one of the list boxes automatically causes entries in other of the list boxes that are related to the user selection to be identified. As previously noted, the user selection can be one or more selections. The processing of multiple selections is the same as for individually selections, except that the processing repeats for each of the entries within the group. One way to select multiple entries is for the user to individually select certain entries. Another way to select multiple entries is to select a group of entries. In one embodiment, the selection of a group can be achieved using the group drop down list boxes 122, 138 and 154 illustrated in FIG. 1. For example, with respect to FIGS. 1–4, if a user where to select "Retailers" from the group drop down list box 122, the list box-1 process 202 would obtain a group identifier from the group name table 318 that corresponds to the "Retailers" group. The list box-1 process 202 would also access the customer to group mapping table 312 to convert the group identifier to customer keys and then update the list box 116 to distinguishably display (e.g., highlighting) the selected entries. The customer keys would also be forwarded from the list box-1 process 202 to the list box processes 204 and 206 for processing. In the case where the selection is made in the list box 132, the product to group mapping table 316 is used to convert the group identifier to product keys. Similarly, in the case where the selection is made in the list box 148, the invoice to group mapping table 314 is used to convert the group identifier to invoice keys.

Figure 12:
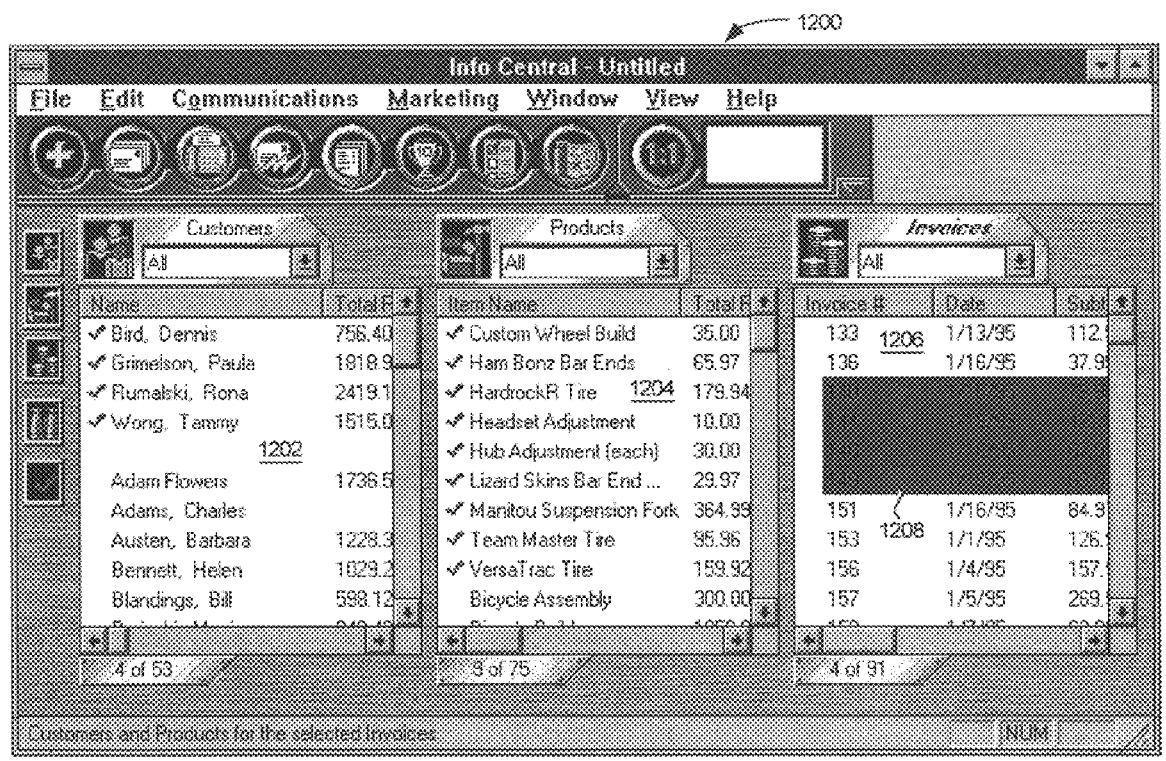
Figure 13:
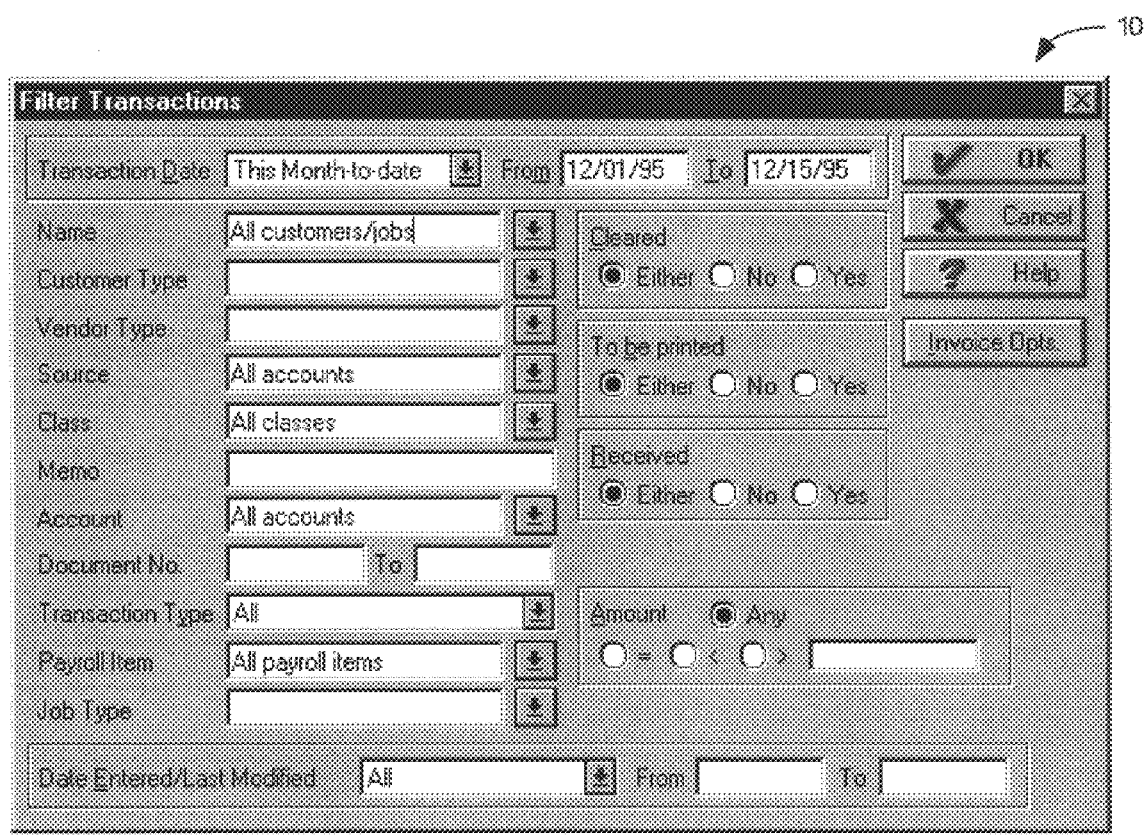

FIG. 11 provides an example of a group selection. In FIG. 11, a user select "Parts" as a group from the group drop down list box 1112 of the second information area 1114. Consequently, highlighted entries 1110 appear in the products list box 1106, and entries related to the parts group appear selected in the list boxes 1102 and 1108. Similarly, in FIG. 12 which is a pictorial diagram of a main screen 1200 illustrates a multiple selection of entries 1208 in the invoice list box 1206. Entries in the list boxes 1202 and 1204 that are related to the multiple selection of entries 1208 also appear selected.

The invention employs various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, retrieving, determining, or comparing. Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. An exemplary structure for the invention is described below with respect to FIG. 9.

Figure 9:
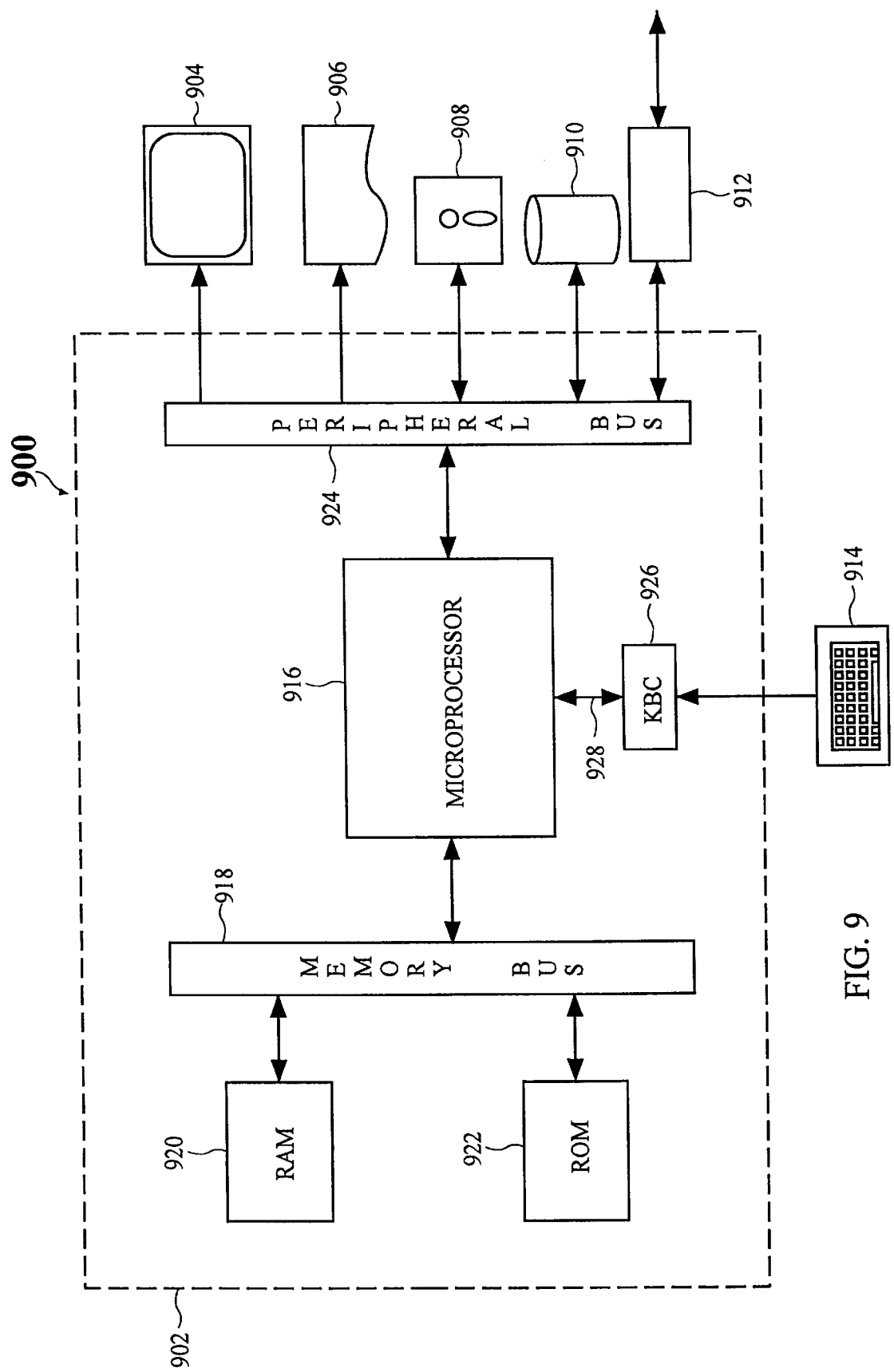
FIG. 9 is a block diagram of an exemplary computer system for carrying out the processing according to the invention.

FIG. 9 is a block diagram of an exemplary computer system 900 for carrying out the processing according to the invention. The computer system 900 includes a digital computer 902, a display screen (or monitor) 904, a printer 906, a floppy disk drive 908, a hard disk drive 910, a network interface 912, and a keyboard 914. The digital computer 902 includes a microprocessor 916, a memory bus 918, random access memory (RAM) 920, read only memory (ROM) 922, a peripheral bus 924, and a keyboard controller 926. The digital computer 900 can be a personal computer (such as an IBM compatible personal computer), a workstation computer (such as a Sun Microsystems or Hewlett-Packard workstation), or some other type of computer.

The microprocessor 916 is a general purpose digital processor which controls the operation of the computer system 900. The microprocessor 916 can be a single-chip processor or can be implemented with multiple components. Using instructions retrieved from memory, the microprocessor 916 controls the reception and manipulation of input data and the output and display of data on output devices. According to the invention, a particular function of microprocessor 916 is to interact with a database (stored in RAM 920, the floppy disk drive 908, or the hard disk drive 910) so as to display information from related tables of the database in different display windows on the display screen 904 associated with the computer system 900 such that a selection of one or more entries in one of the display windows causes the other of the display windows to distinguishably and orderly display those entries that are related to the selection.

The memory bus 918 is used by the microprocessor 916 to access the RAM 920 and the ROM 922. The RAM 920 is used by the microprocessor 916 as a general storage area and as scratch-pad memory, and can also be used to store input data and processed data. The ROM 922 can be used to store instructions or program code followed by the microprocessor 916 as well as other data.

The peripheral bus 924 is used to access the input, output, and storage devices used by the digital computer 902. In the described embodiment, these devices include the display screen 904, the printer device 906, the floppy disk drive 908, the hard disk drive 910, and the network interface 912. The keyboard controller 926 is used to receive input from keyboard 914 and send decoded symbols for each pressed key to microprocessor 916 over bus 928.

The display screen 904 is an output device that displays images of data provided by the microprocessor 916 via the peripheral bus 924 or provided by other components in the computer system 900. According to the invention, different display windows of a main screen presented to a user are interlinked such that a selection of one or more entries in one of the display windows causes the other of the display windows to distinguishably display those entries that are related to the selection. The printer device 906 when operating as a printer provides an image on a sheet of paper or a similar surface. Other output devices such as a plotter, typesetter, etc. can be used in place of, or in addition to, the printer device 906.

The floppy disk drive 908 and the hard disk drive 910 can be used to store various types of data. The floppy disk drive 908 facilitates transporting such data to other computer systems, and hard disk drive 910 permits fast access to large amounts of stored data.

The microprocessor 916 together with an operating system operate to execute computer code and produce and use data. The computer code and data may reside on the RAM 920, the ROM 922, or the hard disk drive 920. The computer code and data could also reside on a removable program medium and loaded or installed onto the computer system 900 when needed. Removable program mediums include, for example, CD-ROM, PC-CARD, floppy disk and magnetic tape.

The network interface 912 is used to send and receive data over a network connected to other computer systems. An interface card or similar device and appropriate software implemented by the microprocessor 916 can be used to connect the computer system 900 to an existing network and transfer data according to standard protocols.

The keyboard 914 is used by a user to input commands and other instructions to the computer system 900. Other types of user input devices can also be used in conjunction with the present invention. For example, pointing devices such as a computer mouse, a track ball, a stylus, or a tablet can be used to manipulate a pointer on a screen of a general-purpose computer.

The invention can also be embodied as computer readable code on a computer readable medium. The computer readable medium is any data storage device that can store data which can be thereafter be read by a computer system. Examples of the computer readable medium include read-only memory, random-access memory, CD-ROMs, magnetic tape, optical data storage devices. The computer readable medium can also be distributed over a network coupled computer systems so that the computer readable code is stored and executed in a distributed fashion.

The advantages of the invention are numerous. One advantage of the invention is that a user is able to obtain and view on a display screen information within a database related to a selection by the user with minimal user effort and frustration. As a result, the user is able to more efficiently and effectively review related information than conventionally possible. Although the described exemplary embodiment pertains to a small business application program, the invention is applicable to a variety of other situations.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A computer system, comprising:
   a database containing tables of data;
   a display device, said display device having a plurality of display areas, each of the display areas displays data items from an associated table within said database; and
   a processor unit, said processor unit operates to access said database to retrieve the data items from the corresponding associated tables and then display the retrieved data items in the display areas corresponding thereto, and to detect a selection of a displayed data item within a selected one of the display areas by a user and thereafter to automatically modify the data items being displayed in the other of the display areas in accordance with the selected data item by accessing said database to retrieve the data items in two groups, those data items that are related to the selected data item and those data items that are unrelated to the selected data item, by ordering the data items within each of the groups separately, and by respectively displaying the ordered data items for each of the groups in the other of the display areas so that the group of the data items in the other of the display areas that is related to the selected data item is displayed in a visually distinct manner as compared to the group of the data items in the other of the display areas that is unrelated to the selected data item.

2. A computer system as recited in claim 1, wherein those entries displayed in the other of the display areas that are related to the selected data item are displayed in a graphically distinctive manner from those entries being displayed that are unrelated to the selected data item.

3. A computer system, comprising:
   a database containing tables of data;
   a display device, said display device having a plurality of display areas, each of the display areas displays data items from an associated table within said database; and
   a processor unit, said processor unit operates to access said database to retrieve the data items from the corresponding associated tables and then display the retrieved data items in the display areas corresponding thereto, and to detect a selection of a displayed data item within a selected one of the display areas by a user and thereafter to automatically modify the data items being displayed in the other of the display areas in accordance with the selected data item by obtaining a key from the database in accordance with the selected data item, notifying the other of the display areas of the key, and updating the data items in the other of the display areas so as to visually distinguish those of the data items that are associated with the key from those data items that are not associated with the key.

4. A graphical user interface for a display screen of a computer, said graphical user interface comprising:
   a first display area having a first label and a first data window, the first data window displays a first type of data in multiple rows and columns, and the first label identifies the first type of data; and
   a second display area having a second label and a second data window, the second data window displays a second type of data in multiple rows and columns, and the second label identifies the second type of data,
   wherein one of a first selection of at least one of the rows in the first data window and a second selection of at least one of the rows in the second data window can be made,
   wherein the first selection of at least one of the rows in the first data window automatically causes the rows in the second data window that are associated with the first selection to be visually distinguished from other of the rows, and
   wherein the second selection of at least one of the rows in the second data window automatically causes the rows in the first data window that are associated with the second selection to be visually distinguished from other of the rows.

5. A graphical user interface as recited in claim 4, wherein said graphical user interface further comprises:
a third display area having a third label and a third data window, the third data window displays a third type of data in multiple rows and columns, and the third label identifies the third type of data,
wherein one of the first selection of at least one of the rows in the first data window, the second selection of at least one of the rows in the second data window and a third selection of at least one of the rows in the third data window can be made,
wherein the first selection of the at least one of the rows in the first data window automatically causes the rows in the second and third data windows that are associated with the first selection to be visually distinguished from other of the rows,
wherein the second selection of at least one of the rows in the second data window automatically causes the rows in the first and third data windows that are associated with the second selection to be visually distinguished from other of the rows, and
wherein the third selection of at least one of the rows in the third data window automatically causes the rows in the first and second data windows that are associated with the third selection to be visually distinguished from other of the rows.

6. A graphical user interface as recited in claim 4, wherein said graphical user interface is associated with a business application program for a business,
wherein the first label and the first data window are associated with customers of the business, and the second label and the second data window are associated with products or services of the business, and the third label and the third data window are associated with invoices of the business.

7. A method for displaying data on a display device of a computer system, the data being obtained from a database associated with the computer system, said method comprising:
providing the display device with a plurality of display areas, each of the display areas displays a list of data records from an associated table within the database; and
interlinking the display areas via the database such that a selection of certain of the displayed data records from the list in one of the display areas causes one or more data records displayed in at least one of the other display areas that are associated with the selection to be identified in a visually distinct manner, said interlinking including the operations of accessing the database to retrieve data records in two groups, those data records that correspond to the election and those data records that do not, ordering the data records within each of the groups separately, and respectively displaying the ordered data records for each of the groups in at least one of the other display areas,
wherein said interlinking of the display areas is achieved in accordance with at least the relationship between the associated tables of the database.

8. A method for displaying data on a display device of a computer system, the data being obtained from tables in a database associated with the computer system, the display device having a plurality of display areas, said method comprising the operations of:

(a) displaying entries from the database in the display areas;
(b) determining whether a selection of one or more entries being displayed in a particular one of the display areas has occurred;
(c) obtaining a key from the database in accordance with the selection;
(d) notifying the other of the display areas of the key; and
(e) updating the entries in the other of the display areas so as to visually distinguish those of the entries that are associated with the key with those entries that are not associated with the key.

9. A method as recited in claim 8, wherein said updating (e) comprises:
(e1) accessing the database in accordance with the key to obtain the retrieved entries in the other of the display areas; and
(e2) displaying the retrieved entries in the other of the display areas, with those of the entries that are associated with the key being distinguishably displayed from those entries that are not associated with the key.

10. A method as recited in claim 9, wherein each of the display areas has an associated table in the database and the entries being displayed in each of the display areas are obtained from the associated table, and
wherein the key is obtained from the table in the database that is associated with the particular one of the display areas where the selection occurred.

11. A method as recited in claim 8, wherein each of the display areas has an associated table in the database, and
wherein the key is obtained from the table in the database that is associated with the particular one of the display areas where the selection occurred.

12. A method as recited in claim 11, wherein said updating (e) comprises, for each of the other of the display areas, the operations of:
(e1) retrieving a first set of entries from the associated table in the database that is associated with the key;
(e2) retrieving a second set of entries from the associated table in the database that are not associated with the key; and
(e3) displaying the first and second sets of entries in the corresponding display area with the first set of entries being distinguishably displayed from the second set of entries.

13. A method as recited in claim 11, wherein said updating (e) comprises, for each of the other of the display areas, the operations of:
(e1) retrieving a first set of entries from the associated table in the database that is associated with the key;
(e2) sorting the first set of entries in accordance with a predetermined criteria;
(e3) retrieving a second set of entries from the associated table in the database that are not associated with the key;
(e4) sorting the second set of entries in accordance with a predetermined criteria; and
(e5) displaying the sorted first set of entries followed by the sorted second set of entries in the corresponding display area with the sorted first set of entries being distinguishably displayed from the sorted second set of entries.

14. A method as recited in claim 13, wherein said displaying (e5) distinguishably displays the sorted first set of entries from the sorted second set of entries by placing a graphical indicator adjacent to each of the sorted first set of entries.

15. A computer readable media containing program instructions for displaying data on a display device of a computer system, the data being obtained from tables in a database associated with the computer system, the display device having a plurality of display areas, said computer readable media comprising:

first computer readable code devices for determining whether a selection of one or more entries being displayed in a particular one of the display areas has occurred;

second computer readable code devices for obtaining a key from the database in accordance with the selection;

third computer readable code devices for notifying the other of the display areas of the key; and fourth computer readable code devices for updating the entries in the other of the display areas so as to visually distinguish those of the entries that are associated with the key from those entries that are not associated with the key.

16. A computer readable medium as recited in claim 15, wherein said fourth computer readable code devices comprise:

computer readable code devices for accessing the database in accordance with the key to obtain the retrieved entries in the other of the display areas; and computer readable code devices for displaying the retrieved entries in the other of the display areas, with those of the entries that are associated with the key being distinguishably displayed from those entries that are not associated with the key.

17. A computer readable medium as recited in claim 16, wherein each of the display areas has an associated table in the database, and the key is obtained from the table in the database that is associated with the particular one of the display areas where the selection occurred.

18. A computer readable media as recited in claim 15, wherein said fourth computer program code comprises:

computer program code for identifying at least one of those of the entries that are associated with the key and those of the entries that are not associated with the key; and computer program code for distinguishably displaying those of the entries associated with the key in the corresponding display area from those of the entries not associated with the key.

19. A computer readable media as recited in claim 18, wherein said fourth computer program code further comprises:

computer program code for sorting those of the entries associated with the key with respect to the corresponding display area.

20. A computer readable media as recited in claim 18, wherein said fourth computer program code further comprises:

computer program code for determining a select count indicating a number of those of the entries in the corresponding display area associated with the key; and computer program code for displaying the select count on the display device proximate to the corresponding display area.

21. A computer readable media as recited in claim 20, wherein said fourth computer program code further comprises:

computer program code for sorting those of the entries associated with the key with respect to the corresponding display area.

22. A computer readable media as recited in claim 18, wherein said fourth computer program code further comprises:

computer program code for determining a select count indicating a number of those of the entries in the corresponding display area associated with the key; and computer program code for determining a total count indicating a total number of those of the entries in the corresponding display area; and computer program code for displaying the select count and the total count on the display device proximate to the corresponding display area.

* * * * *